(12) United States Patent
Jeon et al.

(10) Patent No.: US 10,007,475 B2
(45) Date of Patent: Jun. 26, 2018

(54) FLEXIBLE DISPLAY DEVICE

(71) Applicant: LG ELECTRONICS INC., Seoul (KR)

(72) Inventors: Hyunjoo Jeon, Seoul (KR); Youngjun Kim, Seoul (KR); Eunjeong Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 15/131,945

(22) Filed: Apr. 18, 2016

(65) Prior Publication Data

US 2017/0168769 A1    Jun. 15, 2017

(30) Foreign Application Priority Data

Dec. 10, 2015  (KR) .................. 10-2015-0176366

(51) Int. Cl.
| | |
|---|---|
| *G09G 5/00* | (2006.01) |
| *G06F 3/14* | (2006.01) |
| *G06F 3/0488* | (2013.01) |
| *G06F 3/0481* | (2013.01) |
| *G06F 3/0482* | (2013.01) |
| *G06F 1/16* | (2006.01) |

(52) U.S. Cl.
CPC .......... *G06F 3/1446* (2013.01); *G06F 1/1652* (2013.01); *G06F 3/0482* (2013.01); *G06F 3/0488* (2013.01); *G06F 3/04817* (2013.01); *G06F 3/1431* (2013.01)

(58) Field of Classification Search
CPC .. G06F 1/1652; G06F 3/04817; G06F 3/0482; G06F 3/0488; G06F 3/1431; G06F 3/1446
See application file for complete search history.

(56) References Cited

U.S. PATENT DOCUMENTS

| | | | |
|---|---|---|---|
| 2013/0275910 A1* | 10/2013 | Kim | G06F 3/0484 |
| | | | 715/800 |
| 2014/0325431 A1 | 10/2014 | Vranjes et al. | |
| 2014/0333545 A1* | 11/2014 | Lee | G06F 1/1643 |
| | | | 345/173 |

FOREIGN PATENT DOCUMENTS

| | | |
|---|---|---|
| EP | 2701035 A1 | 2/2014 |
| KR | 10-2013-0087216 A | 8/2013 |
| KR | 10-2014-0143610 A | 12/2014 |
| KR | 10-2015-0106641 A | 9/2015 |
| KR | 10-2015-0111233 A | 10/2015 |

OTHER PUBLICATIONS

Khalilbeigi et al., "Xpaaand: Interaction Techniques for Rollable Displays," CHI 2011 Session: Interaction on Mobile Devices, May 7-12, 2011, pp. 2729-2732.

* cited by examiner

*Primary Examiner* — Insa Sadio
(74) *Attorney, Agent, or Firm* — Birch, Stewart, Kolasch & Birch, LLP

(57) ABSTRACT

A flexible display device including a memory; a display including an extendable and reducible screen; a sensor configured to detect a size of the screen; and a controller configured to display information on the extended screen, and store the information in the memory in response to the size of the screen being reduced while the information is selected.

18 Claims, 48 Drawing Sheets

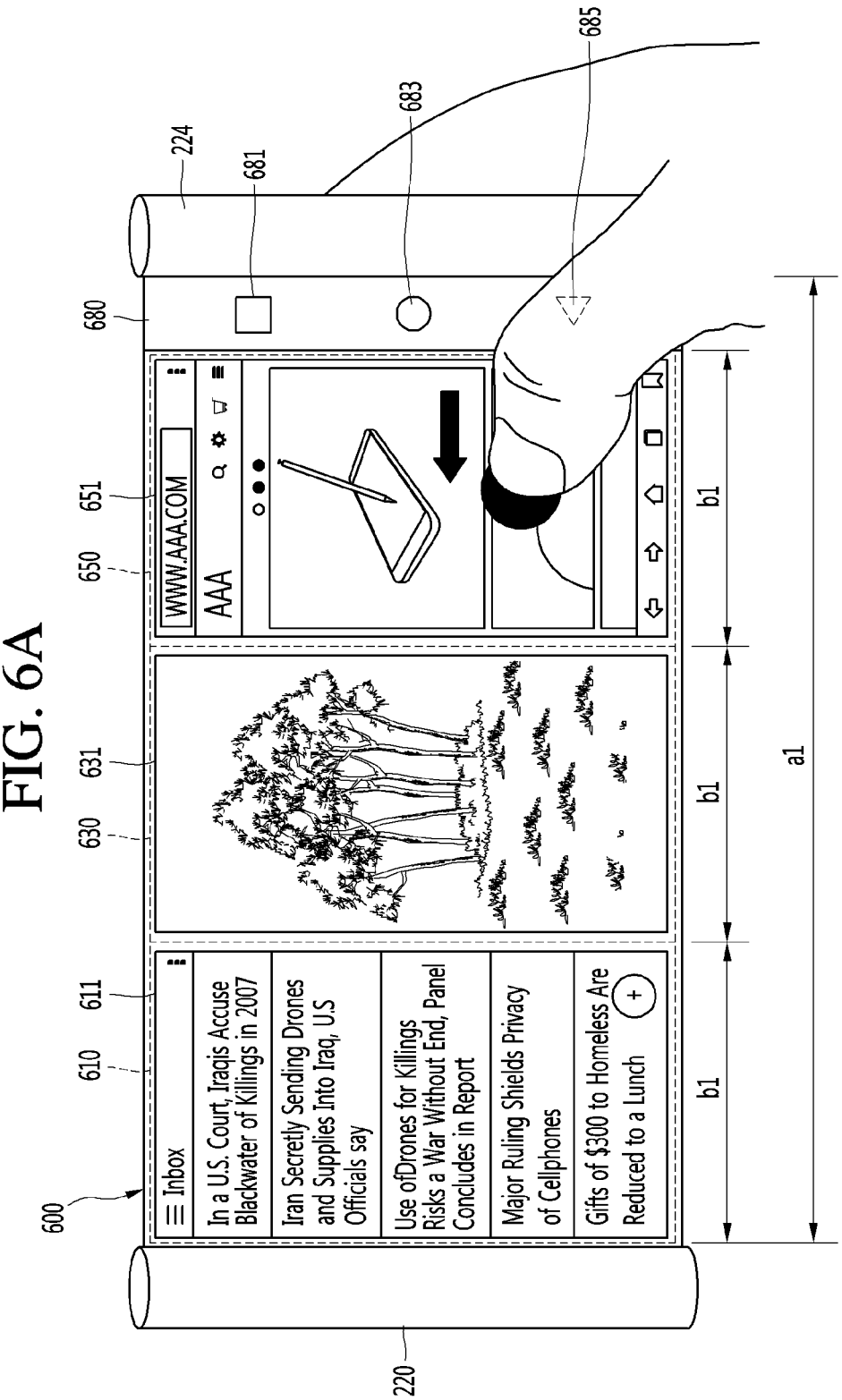

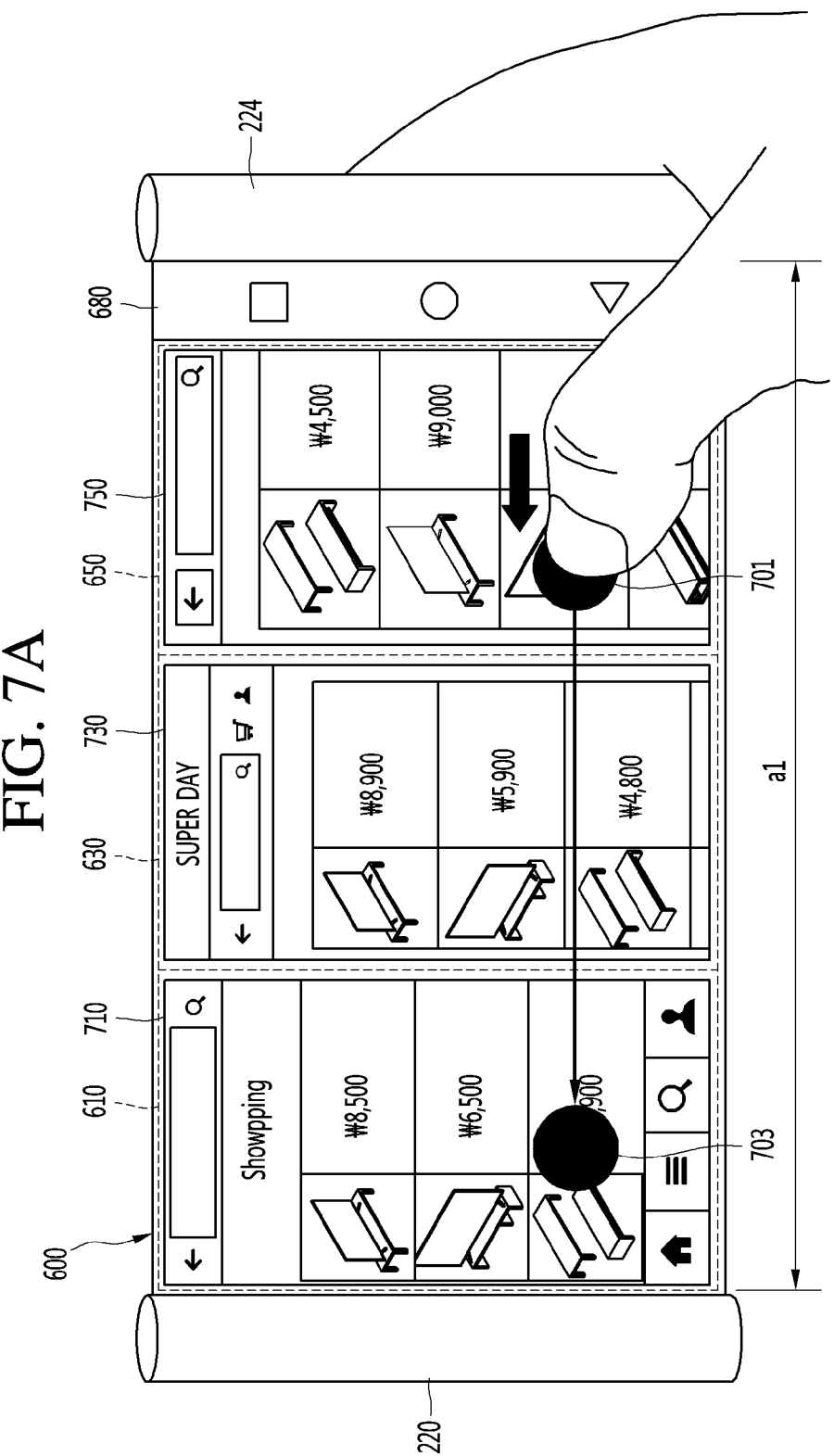

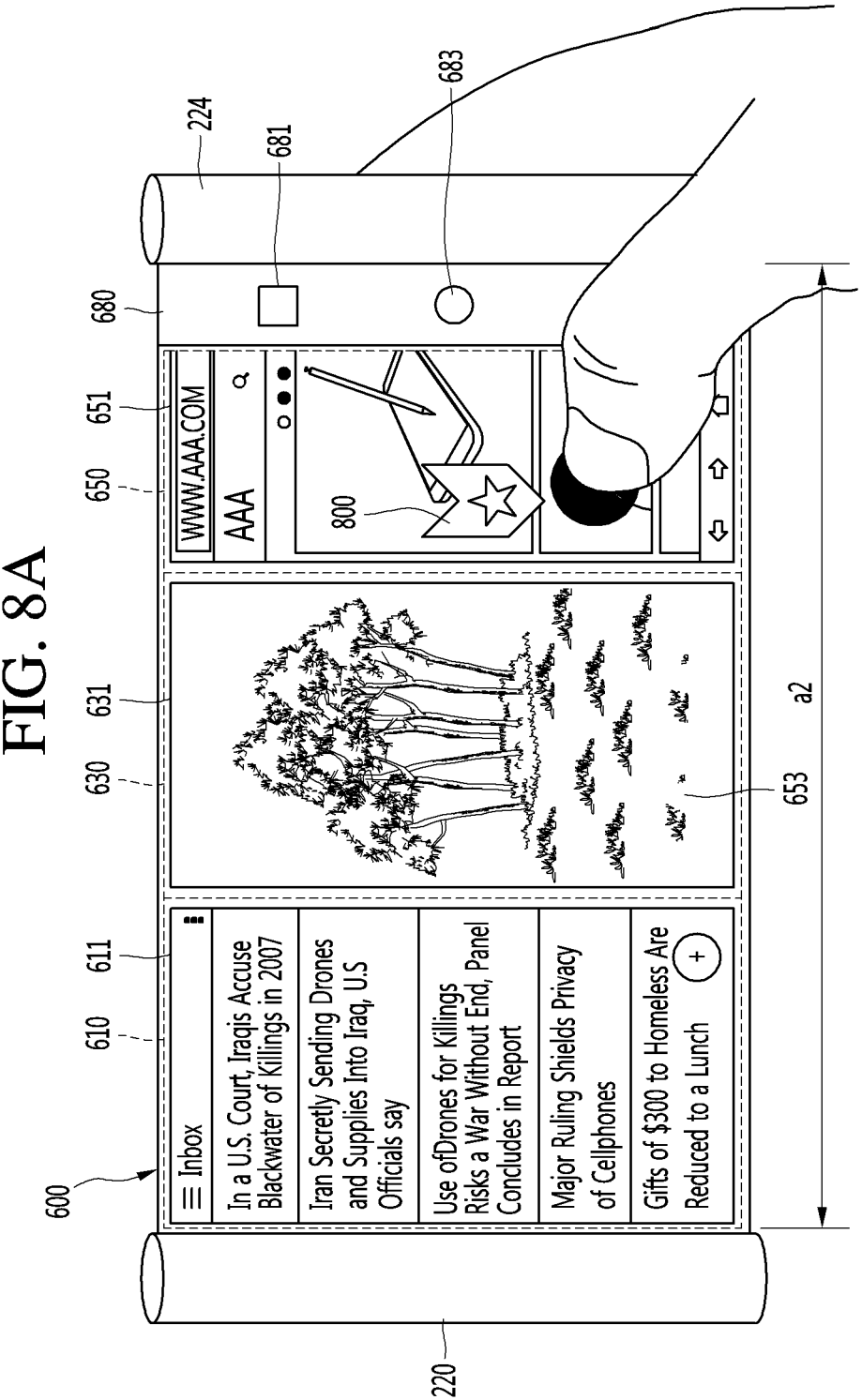

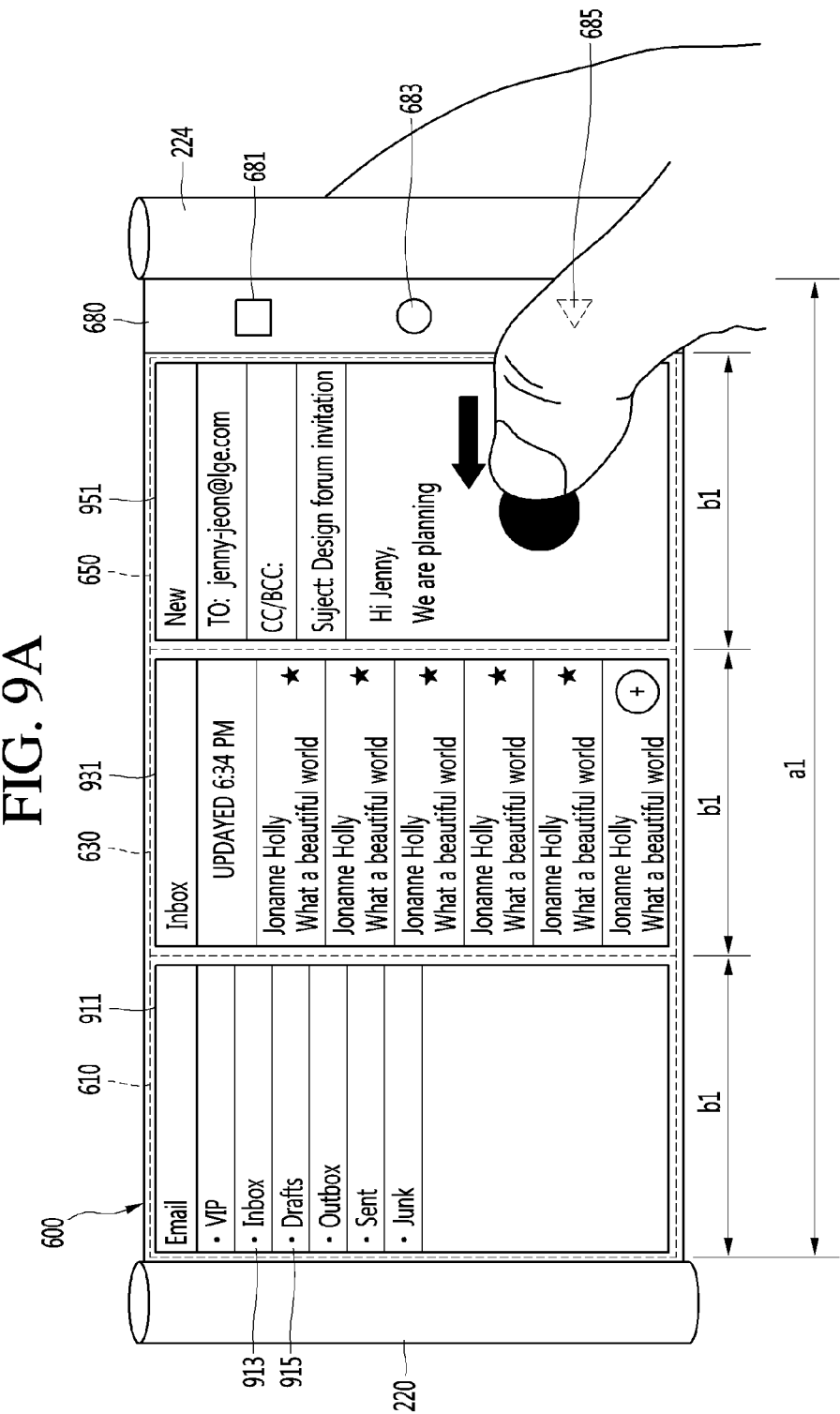

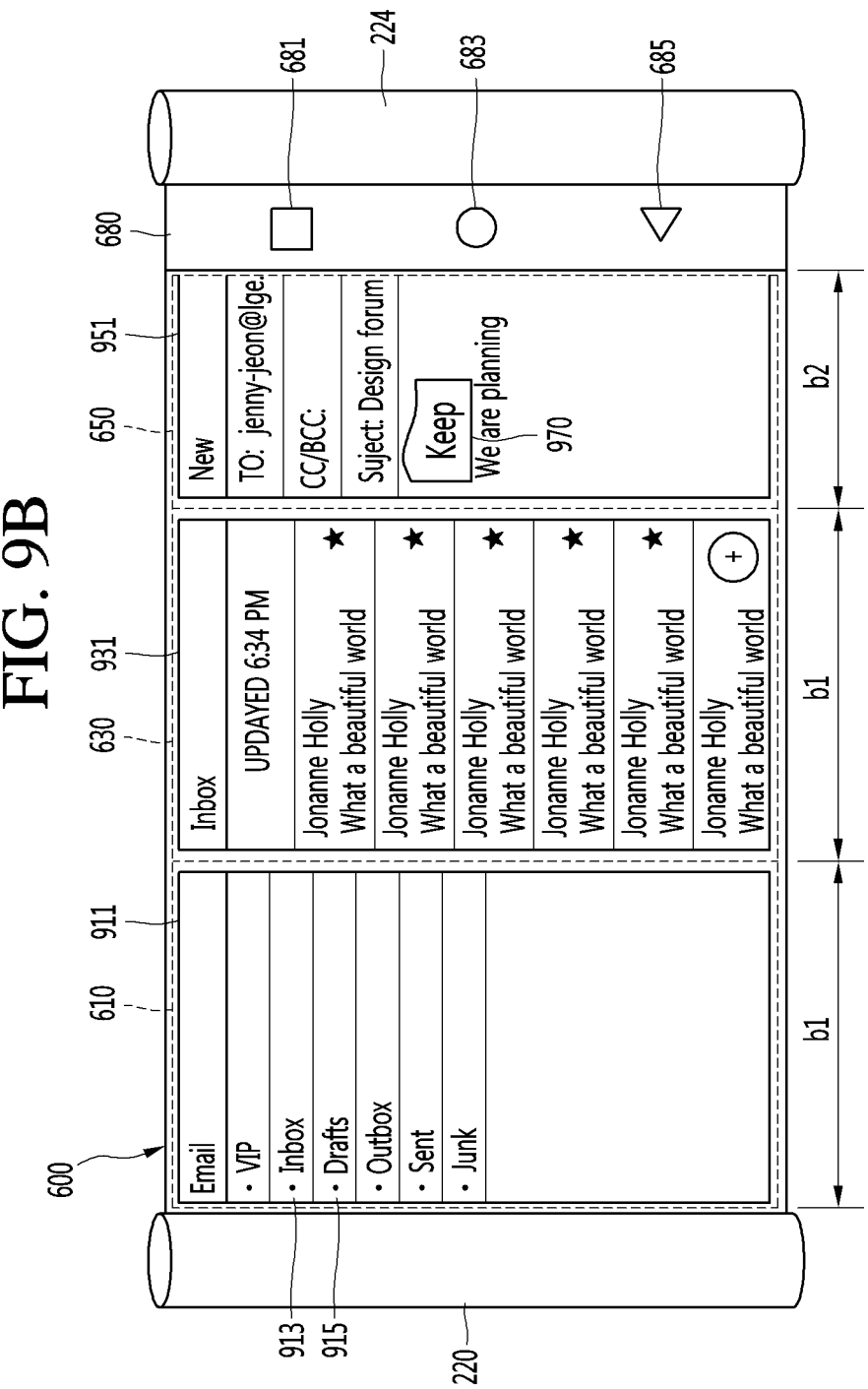

FLEXIBLE DISPLAY DEVICE

CROSS-REFERENCE TO RELATED APPLICATIONS

The present application claims priority under 35 U.S.C. § 119 and 35 U.S.C. § 365 to Korean Patent Application No. 10-2015-0176366 (filed on Dec. 10, 2015), which is hereby incorporated by reference in its entirety.

BACKGROUND

Field of the Invention

The present disclosure relates to a flexible display device.

Discussion of the Related Art

With the development of a display technology, researches have been conducted to develop flexible display devices that can be rolled or can be stretched in at least one direction if being used. Such display devices can be variously changed in shape, and thus may satisfy both the requirement of a large-size screen at a stage of display use and the requirement of a compact display size for display portability.

In addition, a flexible display device may be deformed into not only a predetermined shape but also various shapes depending on a user's intention or an environment in which the display device is used. Therefore, if a display area of the display device is fixed, a user may feel a sense of inconvenience.

Furthermore, if the display area of the display device is fixed, the user is required to provide an additional input for capturing a screen or push a favorites button to register or store displayed information in a favorites list. Moreover, since a list of recently used applications simply arranges the recently used applications according to time of use thereof, it may be difficult for the user to directly call an execution window of an application stored by the user.

SUMMARY

Embodiments provide a flexible display device capable of being extended or reduced by a simple operation according to a request of a user.

Embodiments also provide a flexible display device capable of efficiently storing information displayed on a display and easily calling the information.

To achieve these and other advantages and in accordance with the purpose of the present invention, as embodied and broadly described herein, the present invention provides in one aspect a flexible display device including a memory; a display including an extendable and reducible screen; a sensor configured to detect a size of the screen; and a controller configured to display information on the extended screen, and store the information in the memory in response to the size of the screen being reduced while the information is selected. The present invention also provides a corresponding method of controlling the flexible display device.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIGS. 6A to 6E are diagrams illustrating an exemplary process in which selected information is stored if information displayed on an extended screen is selected and the screen is reduced.

FIGS. 7A to 7D are diagrams illustrating another exemplary process in which selected information is stored if information displayed on an extended screen is selected and the screen is reduced.

FIGS. 8A to 8D are diagrams illustrating an exemplary process in which selected information is stored in a bookmark folder or a recent access list if information displayed on an extended screen is selected and the screen is reduced.

FIGS. 9A to 9C are diagrams illustrating an exemplary process in which selected information is selectively stored in a new folder or a normal folder if information displayed on an extended screen is selected and the screen is reduced.

DETAILED DESCRIPTION OF THE EMBODIMENTS

Figure 1A:
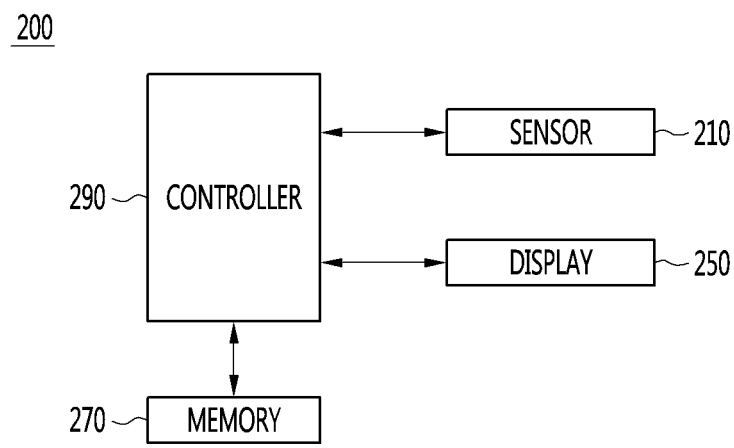
FIG. 1A is a block diagram illustrating a flexible display device according to an embodiment.

Embodiments of the present disclosure will be described in detail with reference to the accompanying drawings. Like reference numerals refer to like elements throughout, and overlapping descriptions are avoided. In the following description, the terms "module" and "unit" for referring to elements are given or used interchangeably in consideration of ease of description, and thus, the terms per se do not necessarily indicate different meanings or functions. Detailed descriptions of the related art are not provided so that the gist of the embodiments is not unnecessarily obscured. Furthermore, the accompanying drawings are provided only to assist with an understanding of the embodiments of the present disclosure and are not intended to limit the technical concept of the present disclosure, and should be construed as covering all modifications, equivalents or alternatives that fall within the spirit and technical scope of the present disclosure.

The term "first", "second" or the like may be used illustrating various elements but does not limit the elements. Such terms are only used for distinguishing one element from other elements. It will be understood that if an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

The terms of a singular form may include plural forms unless otherwise specified. It will be further understood that the terms "comprise", "comprising,", "include", "including", "have" and/or "having", if used herein, specify the presence of stated features, numbers, steps, operations, elements, components or combinations thereof, but do not preclude the presence or addition of one or more other features, numbers, steps, operations, elements, components or combinations thereof.

Figure 1B:
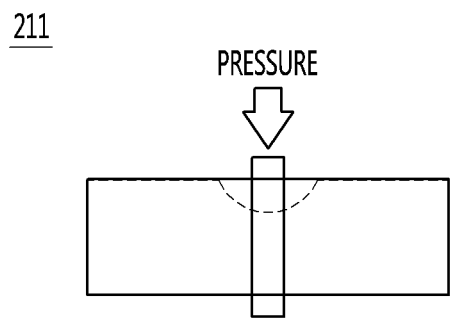
FIG. 1B is a diagram illustrating describing a pressure sensor of a sensor.
Figure 1C:
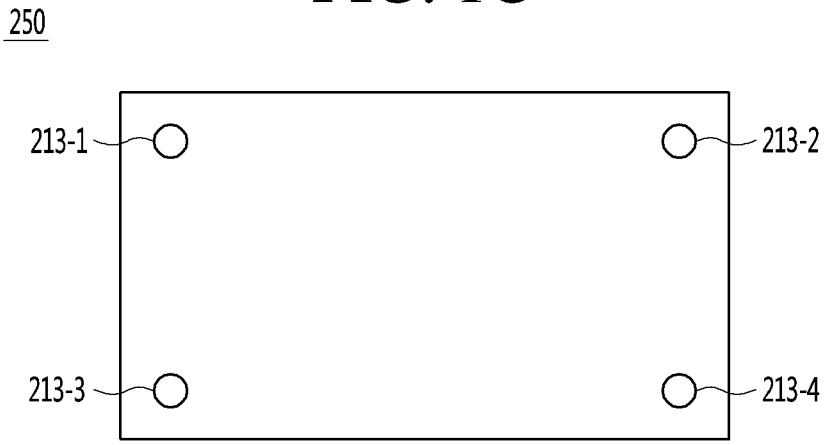
FIG. 1C is a diagram illustrating a display in which the sensor includes a plurality of acceleration sensors.

FIGS. 1A to 1C are diagrams illustrating a flexible display device according to an embodiment. FIG. 1A is a block diagram illustrating a flexible display device 200 according to an embodiment, FIG. 1B is a diagram illustrating describing a pressure sensor 211 of a sensor 210, and FIG. 1C is a diagram illustrating a display 250 in which the sensor 210 includes a plurality of acceleration sensors 213-1 to 213-4.

The flexible display device 200 according to an embodiment is a next-generation display device that is not only bendable but also stretchable and can be implemented in various and new environments, compared to typical display devices implemented using a rigid material such as glass, silicon, or the like.

In one embodiment, the flexible display device 200 can be a stretchable display device that is stretched if being pulled and recovers its original form if being released. If a certain period of time elapses while the flexible display device is being pulled and stretched, the flexible display device can be fixed in a stretched state. If a force is applied to the flexible display device, the flexible display device can contract to recover its original form.

In another embodiment, the flexible display device 200 can be a rollable display device that can be rolled or unrolled like paper. Referring to FIG. 1A, the flexible display device 200 can include the sensor 210, the display 250, a memory 270, and a controller 290. The sensor 210 can detect extension or reduction of the display 250. The sensor 210 can detect a direction or strength of a force applied to the display 250.

In one embodiment, the sensor 210 can include at least one pressure sensor. The at least one pressure sensor can be disposed at the display 250. When the sensor 210 includes at least one pressure sensor, each pressure sensor 211 can detect a change in resistance or capacitance between both ends of an area to which a pressure (or force) is applied as illustrated in FIG. 1B. The pressure sensor 211 can transfer, to the controller 290, at least one of a capacitance change signal indicating a detected capacitance change or a resistance change signal indicating a detected resistance change. The capacitance change signal or the resistance change signal can include information on at least one of the strength or the direction of the force applied to the pressure sensor 211. The controller 290 can obtain at least one of the strength or the direction of the force applied to the display 250, using the capacitance change signal or the resistance change signal received from the pressure sensor 211.

In another embodiment, the sensor 210 can include the plurality of acceleration sensors 213-1 to 213-4 as illustrated in FIG. 1C. When the display 250 has a rectangular shape, each acceleration shape can be disposed adjacent to a vertex of a rectangle. When the display 250 includes a flexible substrate and an image display, the acceleration sensors 213-1 to 213-4 can be arranged under the flexible substrate, and the image display can be disposed on the flexible substrate. However, this arrangement is merely an example, and the acceleration sensors 213-1 to 213-4 can be embedded in the flexible substrate or the image display.

The acceleration sensor serves to detect an intensity of impact or an acceleration of an object. A motion state of the display 250 can be accurately detected using the acceleration sensor. The acceleration sensor can sense the acceleration of the display 250 in three axial (x-axis, y-axis, z-axis) directions perpendicular to each other. The controller 290 can obtain a moving speed using a tri-axial acceleration measured by the acceleration sensor. The controller 290 can obtain a tri-axially extended distance of the display 250 using the obtained moving speed. The controller 290 can obtain the strength and the direction of the force applied to the display 250, using the moving speed and distance obtained using the acceleration sensor. The controller 290 can extend the display 250 according to the direction and the strength of the force.

In another embodiment, the sensor 210 can include a plurality of hall sensors. The plurality of hall sensors can be arranged inside the display 250 or on the display 250. When the sensor 210 includes the plurality of hall sensors, the controller 290 can extend or reduce the display 250 using voltage sensed by the hall sensors.

When the sensor 210 includes the hall sensors, an embodiment in which extension or reduction of the display 250 is detected using the hall sensors will be described with reference to FIGS. 3A to 3F. The display 250 can be stretched in at least one direction. The display 250 can include a flexible substrate and an image display. The flexible substrate can be formed of polydimethylsiloxane (PDMS) and can be extended by a pulling force. The image display can be disposed on the flexible substrate, and can be extended together with the flexible substrate. The image display can display an image.

The display 250 can include an organic light-emitting diode (OLED). The memory 270 can store a strength of a force applied to the display 250 and an extension degree or a reduction degree of the display 250 which corresponds to the strength of the force. The extension degree of the display 250 can indicate an extended length of the display 250, and the reduction degree of the display 250 can indicate a reduced length of the display 250.

The controller 290 can detect extension or reduction of the display 250 via the sensor 210. The extension of the display 250 can indicate that a size of a screen able to be displayed by the display 250 is increased, and the reduction of the display 250 can indicate that the size of the screen able to be displayed by the display 250 is decreased. The controller 290 can change a graphic or an image displayed on the screen according to the increase or decrease in the size of the screen of the display 250. Furthermore, the controller 290 can control overall operation of the flexible display device 200. Operation of the controller 290 will be described in more detail later.

Figure 2A:
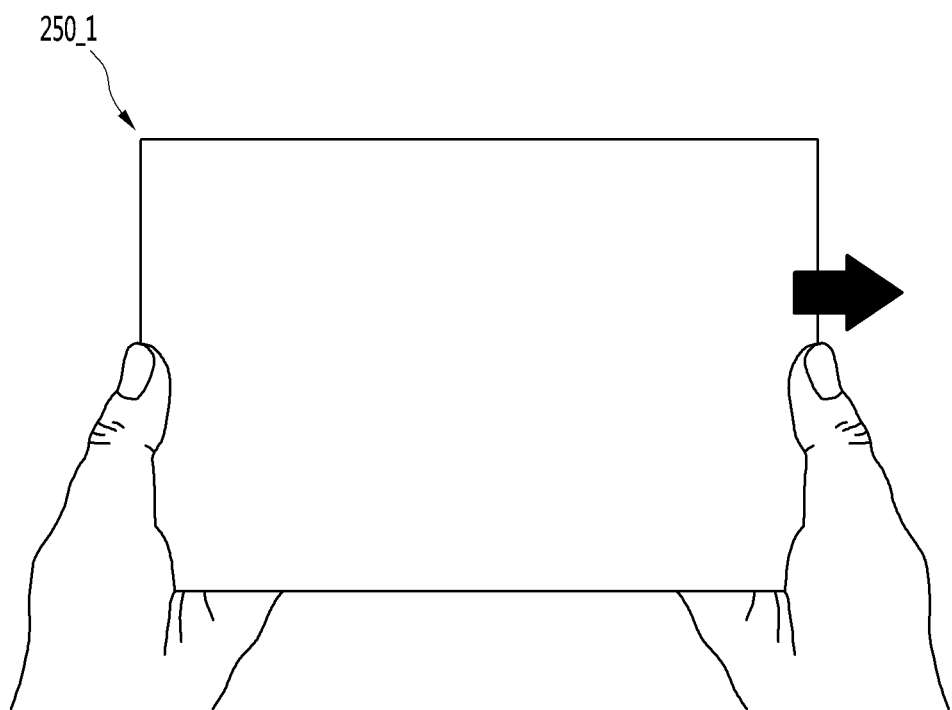
FIGS. 2A and 2B illustrate exemplary use of a stretchable display device that is a type of a flexible display device.
Figure 2B:
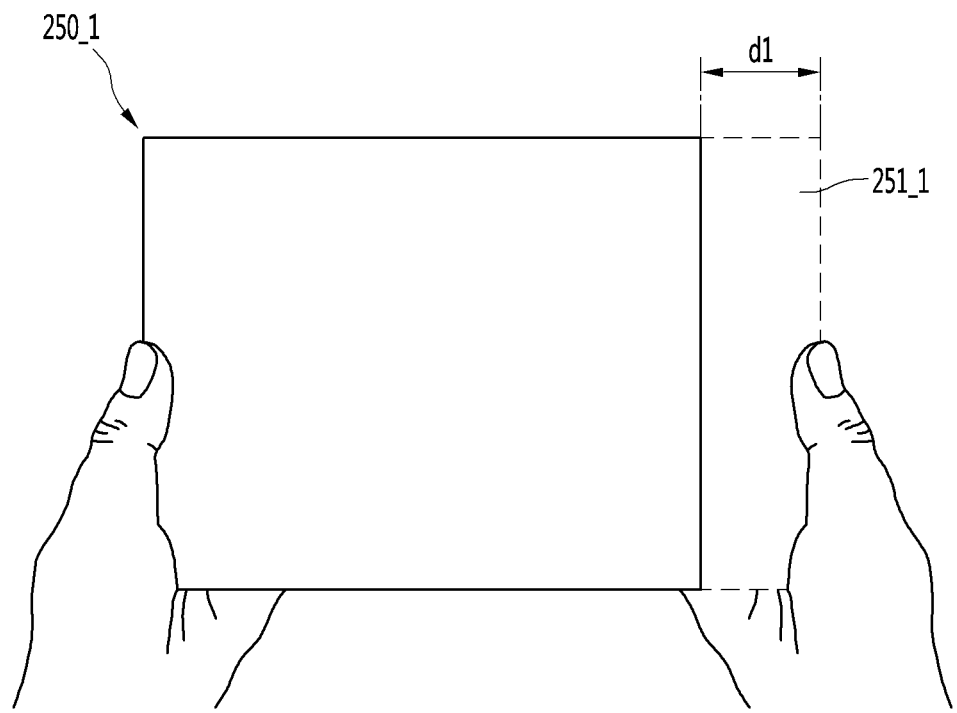

FIGS. 2A and 2B illustrate exemplary use of a stretchable display device that is a type of a flexible display device. FIG. 2A illustrates a state of a display 250_1 before a stretchable display 200_1 is stretched. In this state, if a force is applied to the display 250_1 in a +x-axis direction, the controller 290 can extend the display 250_1 by a distance of dl in the +x-axis direction as illustrated in FIG. 2B. As the display 250_1 is extended, the display 250 can be extended by as much as an extended area 251_1 corresponding to the extended distance dl. That is, the screen size of the display 250 can be increased by as much as the extended area 251_1. FIG. 2 illustrates that the force is applied in the +x-axis direction, but this is merely an example. When a force is applied to the display 250_1 in a −x-axis direction, the controller 290 can allow the display 250_1 to recover its original size.

Figure 3A:
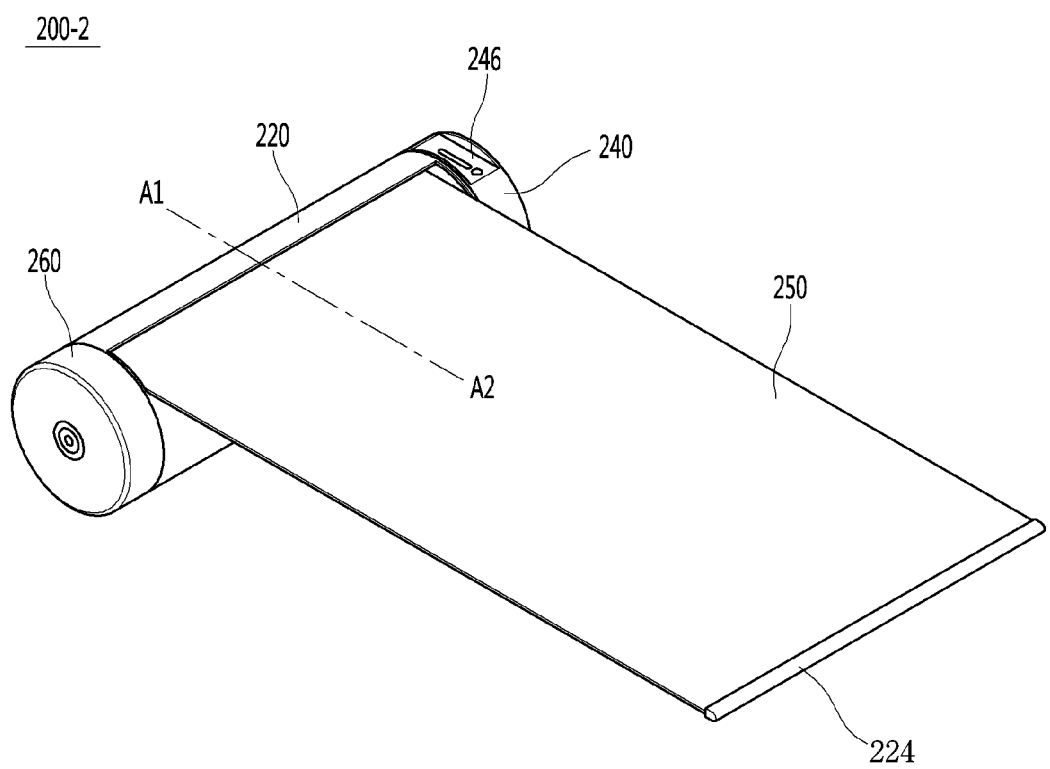
FIGS. 3A to 3F are diagrams illustrating a configuration and operation of a rollable display device which is a type of a flexible display device.
Figure 3B:
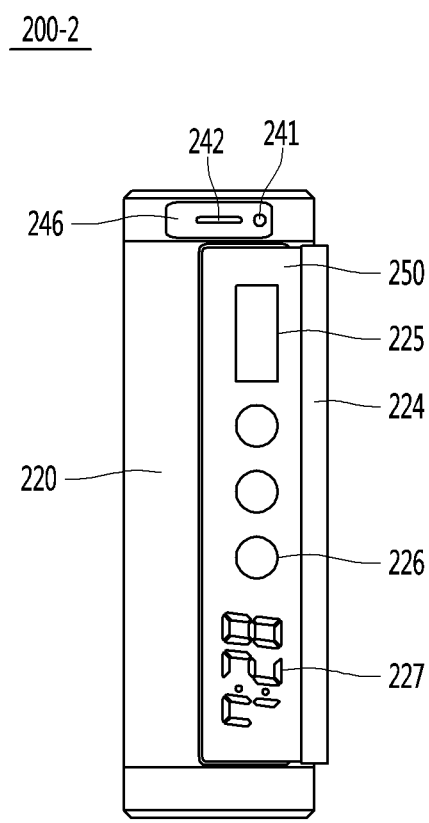
Figure 3C:
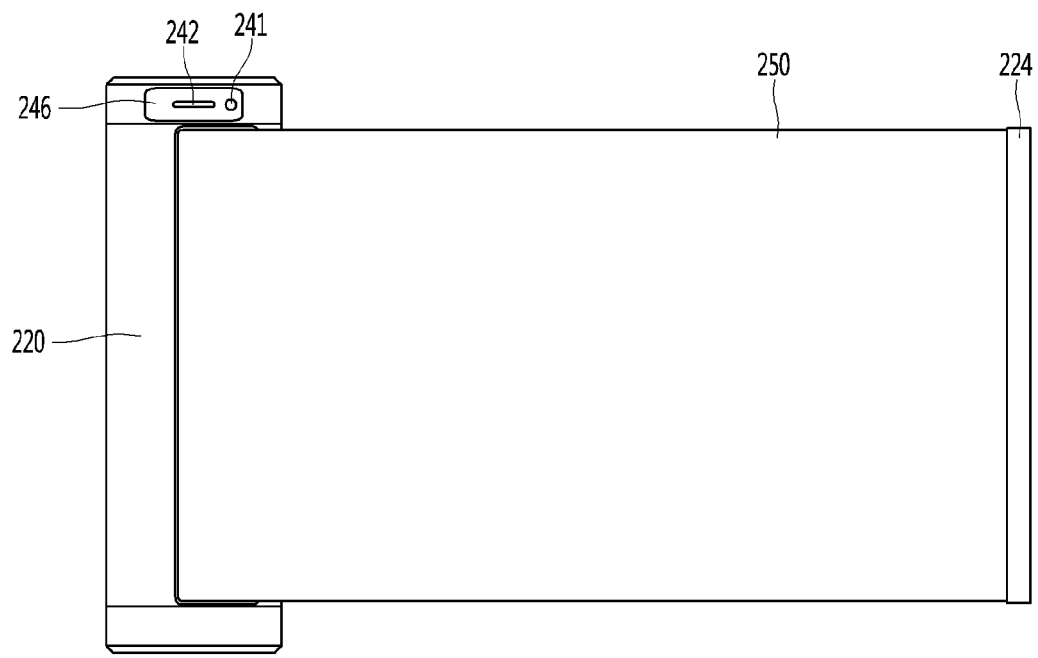
Figure 3D:
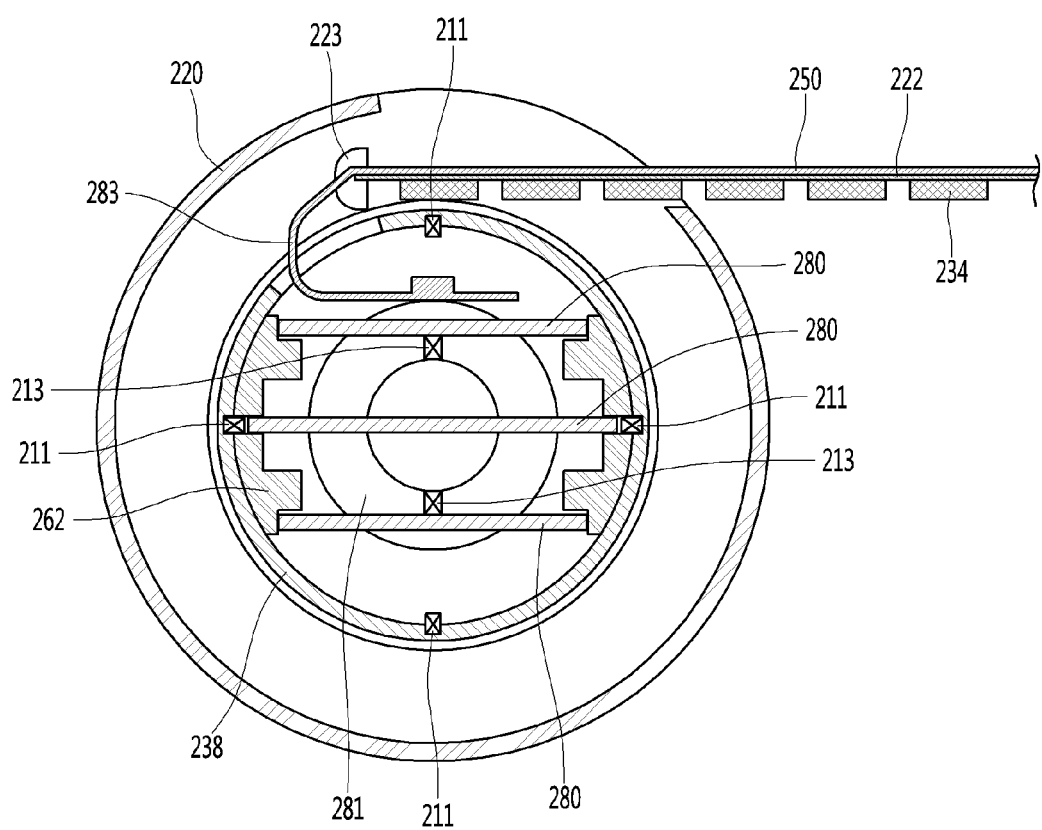
Figure 3E:
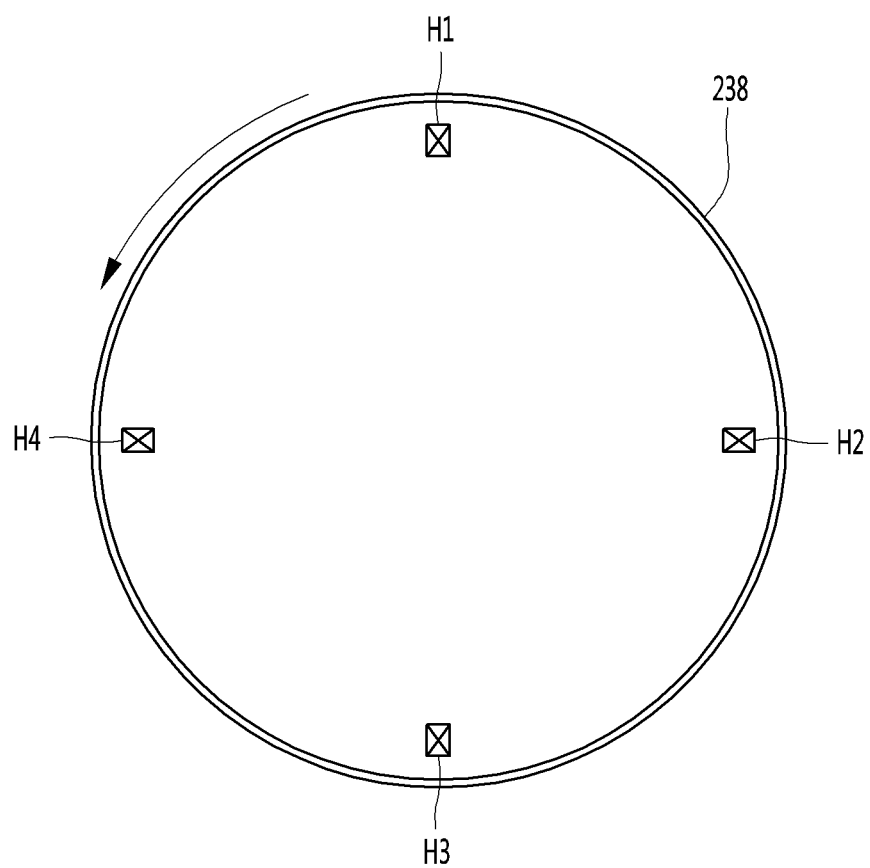
Figure 3F:
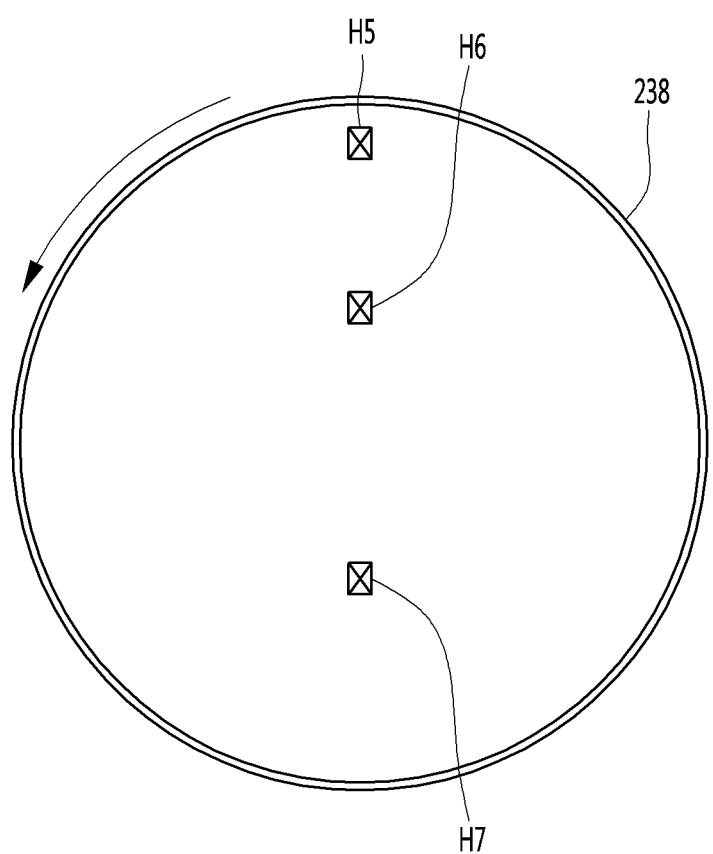

FIGS. 3A to 3F are diagrams illustrating a configuration and operation of a rollable display device which is a type of a flexible display device according to an embodiment. FIG. 3A is a perspective view of the rollable display device according to an embodiment, FIG. 3B is a diagram illustrating the rollable display device that is in a first operation state according to an embodiment, FIG. 3C is a diagram illustrating the rollable display device that is in a second operation state according to an embodiment, FIG. 3D is a cross-sectional view of the rollable display device taken along line A1-A2 of FIG. 3A, and FIGS. 3E and 3F are diagrams illustrating a process of sensing a spread length, a rolled length, or a rotation amount of a display using a hall sensor according to an embodiment.

Referring to FIGS. 3A to 3D, a rollable display device 200-2 can include an upper case 240, an intermediate case 220, a lower case 260, a display 250, a first holder 223, and a second holder 224. The upper case 240, the lower case 260, and the intermediate case 220 form an exterior of the rollable display device 200-2. The intermediate case 220 can have a cylindrical shape, but is not limited thereto and can have various shapes such as a hexahedral shape. As illustrated in FIG. 3D, a part of the intermediate case 220 can be opened so as to expose a part of the display 250.

The upper case 240 and the lower case 260 can cover the intermediate case 220 at an upper side and a lower side thereof. The upper case 240 and the lower case 260 may not expose various components arranged inside the intermediate case 220. A recess part 246 can be formed in the upper case 240, wherein the recess part 246 can be recessed towards the inside of the upper case 240 so as to have a planar shape. At least one of a camera 241 or a sound output unit 242 can be disposed in the recess part 246.

The first holder 223 (see FIG. 3D) can be provided to an end portion of one side of the display 250, and the second holder 224 can be provided to an end portion of another side of the display 250. The first holder 223 can prevent the display 250 from escaping from an inner side of the intermediate case 220 if a screen of the display 250 is maximally extended. The second holder 224 can prevent the display 250 from being rolled into the inner side of the intermediate case 220. A user can draw the second holder 224 in a specific direction to extend the screen of the display 250.

The display 250 can be rolled in towards the inner side of the intermediate case 220, or can be rolled out of the intermediate case 220. That is, the display 250 can be wound, rolled or coiled into the inner side of the intermediate case 220, or can be unwound, unrolled or uncoiled out of the intermediate case 220.

FIG. 3B is a diagram illustrating the first operation state of the rollable display device 200-2, and FIG. 3C is a diagram illustrating the second operation state of the rollable display device 200-2.

When the display 250 is not deformed (e.g., a state of having an infinite radius of curvature, hereinafter referred to as the first operation state), a region displayed by the display 250 can be a plane. When the display 250 is deformed by an external force in the first operation state (e.g., a state of having a finite radius of curvature, hereinafter referred to as the second operation state), a region displayed by the display 250 can be a curved surface. As illustrated in the drawings, information displayed in the second operation state can be time information output to the curved surface. Such time information can be implemented by individually controlling light emission of sub-pixels arranged in a matrix.

In the first operation state, the display 250 may not be flat but curved (e.g., vertically or horizontally curved). In this instance, if an external force is applied to the display 250, the display 250 can be deformed to be flat (or less curved) or more curved.

The display 250 can be combined with a touch sensor to implement a flexible touch screen. If the flexible touch screen is touched, a controller 290 can perform control corresponding to the touch input. The flexible touch screen can detect a touch input not only in the first operation state but also in the second operation state.

The rollable display device 200-2 according to an embodiment can be provided with a deformation detecting unit for detecting deformation of the display 250. The deformation detecting unit can be included in the sensor 210 (see FIG. 1A).

The deformation detecting unit can be provided to the display 250 or the intermediate case 220 so as to detect information on deformation of the display 250. Here, the information on deformation can include a deformation direction, a deformation degree, a deformation portion, or a deformation time of the display 250 or an acceleration of recovery of the display 250 deformed, or can additionally include various information detectable due to warpage of the display 250.

Furthermore, the controller 290 can change information displayed on the display 250 or can generate a control signal for controlling a function of the rollable display device 200-2, based on the information on deformation of the display 250 detected by the deformation detecting unit.

In an embodiment, the first operation state of the rollable display device 200-2 represents an inactive state in which a minimum display region is exposed to the outside so that basic information alone is displayed. The second operation state of the rollable display device 200-2 represents an active state in which the display 250 is extended. Extending of the display 250 can indicate that a screen displayed by the display 250 is extended.

This extending includes gradational extending. A display region of the rollable display device 200-2, which is extended or reduced by rolling the display 250, can be implemented at one time at the moment of the extending or reducing, or the display region can be gradually extended or reduced. Therefore, hereinafter all states excepting the first operation state can be regarded as the second operation state, and the second operation state can be classified into a plurality of stages according to a degree of extension.

As illustrated in FIG. 3B, only regions such as a message window 225, an icon 226, or a time display part 227 can be displayed to minimize an exposed region of the display 250 in the first operation state. However, in the second operation state, the exposed region of the display 250 can be maximized to display information on a larger screen as illustrated in FIG. 3C. It is assumed that FIG. 3C illustrates a state in which the display 250 is maximally extended in some cases.

The controller 290 (see FIG. 1A) can detect an unwound length of the display 250, and can turn on/off a part of the display 250 based on the unwound length. For example, the controller 290 can obtain a length of the display 250 unwound out of an opened region of the intermediate case 220. The controller 290 can turn off the display 250 disposed inside the intermediate case 220, and can turn on the display 250 unwound out of the opened region of the intermediate case 220. Turning on a part of the display 250 can represent that power is applied so that the part of the display 250 displays information, and turning off a part of the display 250 can represent that power is not applied so that the part of the display 250 does not display information. Accordingly, since a part of the display 250 which is not unwound out of the intermediate case 220 is turned off, unnecessary power consumption and heating can be prevented.

Furthermore, if the display 250 is separated from an outer circumferential surface of an inner case 238, the controller 290 can turn on a separated part of the display 250 and can turn off a non-separated part of the display 250. The controller 290 can detect that the display 250 is separated from the outer circumferential surface of the inner case 238 using a length sensor 211 disposed in an inner circumferential surface of the inner case 238, so as to turn on the separated part of the display 250 and turn off the non-separated part of the display 250.

Referring to FIG. 3D, a shaft 281, the inner case 238, the length sensor 211, a rotation amount sensor 213, a plurality of circuit boards 280, a flexible circuit board 283, and a support frame 262 can be arranged in the intermediate case 220. The shaft 281 can be rotated as the inner case 238 rotates.

The inner case 238 can be shaped like a roller, can be rollable, and can serve to wind or unwind the display 250. The inner case 238 is axially connected to the intermediate case 220 so as to be rotatable. The length sensor 211 can sense a wound length or an unwound length of the display 250. The length sensor 211 can include a magnetic member. The length sensor 211 can include at least one hall sensor. The length sensor 211 will be described later in more detail.

The rotation amount sensor 213 can sense the number of turns of the display 250 wound on the inner case 238. That is, the rotation amount sensor 213 can sense the number of turns of the display 250 wound on the inner case 238 as the display 250 is rolled. The rotation amount sensor 213 can include a magnetic member. The rotation amount sensor 213 can include at least one hall sensor. The rotation amount sensor 213 will be described later in more detail.

A plurality of electronic circuit components for operating the rollable display device 200-2 can be mounted on each circuit board 280. The flexible circuit board 283 can connect electronic circuit components mounted on the inner case 238 to the display 250. The electronic circuit component can include at least one of the sensor 210, the memory 270, or the controller 290 illustrated in FIG. 1A. The support frame 262 can support the circuit board 280, and can be disposed in the inner case 238.

The inner case 238 can be rotated by magnetism between the length sensor 211 and rolling sensors 234 spaced apart from each other under the display 250. The rolling sensor 234 can include a magnetic member, and can include at least one hall sensor. The display 250 can be rotated together with the inner case 238 while being rolled on the inner case 238 by the magnetism. In more detail, the display 250 can be rolled by attraction between the rolling sensor 234 and the length sensor 211. For example, when the length sensor 211 includes an N-pole magnetic member and the rolling sensor 234 includes an S-pole magnetic member, they attract each other. A position of the length sensor 211 can be fixed.

The rolling sensor 234 is attracted towards the length sensor 211 while moving linearly, and the rolling sensors 234 spaced apart from each other are continually introduced into the intermediate case 220. Since the rolling sensor 234 that has been already introduced and the length sensor 211 continuously attract each other, the rolling sensor 234 newly introduced and the length sensor 211 maintain a balance in terms of attraction so that the rolling sensors 234 are rotated around the length sensors 211. By virtue of this mechanism, the display 250 is wound while being rolled.

A sheet 222 provided with the rolling sensor 234 can be disposed on a lower surface of the display 250. The sheet 222 can be included in the display 250, or can be present independently from the display 250. The sheet 222 can be flexible. For example, the sheet 222 can be silicone or Thermoplastic Poly Urethane (TPU). The sheet 222 can be bonded to the lower surface of the display 250 in the form of a sheet frame, can sequentially fix the rolling sensors 234, and can be formed through bonding, tape or insert molding.

Furthermore, the sheet 222 can be formed of a material that is flexible, has excellent elasticity and elongation, and enables maintenance of a small thickness of the sheet 222. This is intended to allow the rolling sensors 234 to have the same magnetic pole so that the display 250 is spread flat by repulsion. That is, the rolling sensors 234 having the same magnetic pole repel each other by a repulsive force so that the display 250 is spread flat.

The length sensor 211 can sense magnetism between the rolling sensor 234 and the length sensor 211 to calculate the wound length or the unwound length of the display 250. The rotation amount sensor 213 can sense the number of turns of the display 250 wound on the outer circumferential surface of the inner case 238. This will be described later in more detail with reference to FIGS. 3E and 3F.

Referring to FIG. 3E, the length sensor 211 can include four hall sensors H1 to H4. The four hall sensors are arranged on the inner circumferential surface of the inner case 238 or an inner space thereof along a circumferential direction of the inner case 238, while being spaced apart from each other by a fixed distance. Here, first to fourth hall sensors H1 to H4 sense movement of the rolling sensor 234 by sensing a change of magnetism in the circumferential direction of the inner case 238.

The arrows of FIGS. 3E and 3F represent a rotation direction of the inner case 238. The first hall sensor H1 alone senses the rolling sensor 234 in the second operation state in which the display 250 is maximally exposed as the inner case 238 is rotated. Thereafter, if the inner case 238 is rotated counterclockwise, the display 250 is wound on the inner case 238, and the second to fourth hall sensors H2 to H4 sequentially sense the rolling sensor 234.

As described above, the first to fourth hall sensors H1 to H4 provide information for measuring a length of the display 250 wound along the outer circumferential surface of the inner case 238. The controller 290 can detect a sensor that lastly senses the rolling sensor 234 if the display 250 is wound or unwound. Accordingly, the controller 290 can calculate the wound length or the unwound length of the display 250. This is the same for the case where the display 250 is wound on the inner case 238 by multiple turns.

When the display 250 is wound on the outer circumferential surface 238 in two or more layers, magnetism is changed in a radial direction of the inner case 238. Therefore, if a hall sensor for sensing the change is provided, the wound length of the display 250 can be measured more accurately.

For example, as illustrated in FIG. 3F, if two or more hall sensors are spaced apart from each other by a fixed distance in a radial direction of the inner case 238, a magnetism change of the rolling sensor 234 stacked in two or more layers on the outer circumferential surface of the inner case 238 can be sensed, so that the wound length of the display 250 can be calculated more accurately. Although FIG. 3F illustrates three hall sensors, i.e., fifth to seventh hall sensors H5 to H7, this is merely an example. That is, the fifth to seventh hall sensors H5 to H7 sense a magnetism change in a radial direction of the inner case 238 due to the rolling sensor 234.

In more detail, in the second operation state (i.e., the state illustrated in FIG. 3D), the controller 290 can calculate the wound length of the display 250 using the first to fourth hall sensors H1 to H4 while the display 250 is wound in one layer on the inner case 238. When the display 250 is wound in two layers on the inner case 238, the fifth to seventh hall sensors H5 to H7 sense a change of magnetism in a radial direction. The controller 290 can obtain the number of turns of the display 250 wound, using the magnetism change sensed by the fifth to seventh hall sensors H5 to H7.

A length of the display 250 wound thereafter can be calculated using the first to fourth hall sensors H1 to 114, and, if the display 250 is stacked in three layers in a radial direction in which the fifth to seventh hall sensors H5 to H7 are arranged, the magnetism change is sensed by the fifth to seventh hall sensors H5 to H7. As described above, the controller 290 can calculate the length of the display 250 wound on the outer circumferential surface of the inner case 238 using the first to fourth hall sensors H1 to H4, and can calculate the number of turns of the display 250 wound on the outer circumferential surface of the inner case 283 using the fifth to seventh hall sensors H5 to H7.

According to another embodiment, the rollable display device 200-2 can be additionally provided with the upper case 240, the intermediate case 220, and the lower case 260 at another end portion of the display 250. The elements described above with reference to FIG. 3D can be included in the intermediate case 220. Therefore, a user can grip the rollable display device 200-2 with both hands to extend or reduce the display 250. The flexible display device 200 can include all configurations of a mobile terminal 100 described below with reference to FIG. 4.

A mobile terminal included in the flexible display device 200 will be described with reference to FIG. 4. The mobile terminal described herein can include a cell phone, a smartphone, a laptop computer, a terminal for a digital broadcast, a personal digital assistant (PDA), a portable multimedia player (PMP), a navigator, a slate PC, a tablet PC, an ultrabook, a wearable device (e.g., a smartwatch, smart glasses, or a head mounted display (HMD)), or the like.

However, those skilled in the art would understand that configurations according to the embodiments described herein can also be applied to not only mobile devices but also non-mobile devices such as digital TVs, desktop computers or digital signage.

Figure 4:
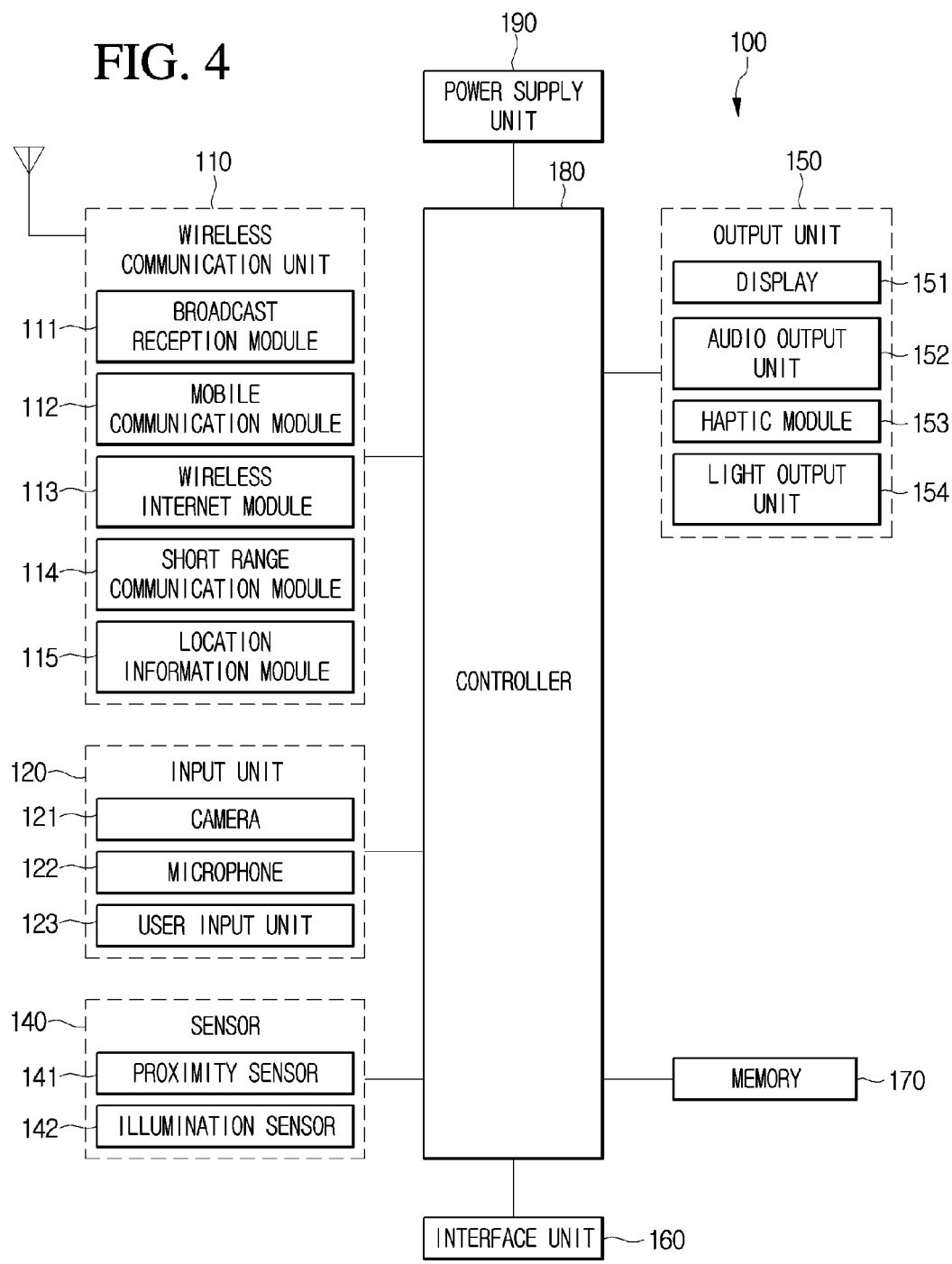
FIG. 4 is a block diagram illustrating describing a mobile terminal in relation to an embodiment.

FIG. 4 is a block diagram illustrating describing a mobile terminal in relation to an embodiment. The flexible display device 200 can include elements of a mobile terminal 100. In particular, the sensor 210 of the flexible display device 200 can perform a function of a sensor 140 of the mobile terminal 100, the display 250 can perform a function of a display 151 of the mobile terminal 100, and the memory 270 can perform a function of a memory 170 of the mobile terminal 100.

The mobile terminal 100 can include a wireless communication unit 110, an input unit 120, a sensor 140, an output unit 150, an interface unit 160, a memory 170, a controller 180, and a power supply unit 190. Since the elements illustrated in FIG. 4 are not essential for realizing a mobile terminal, a mobile terminal to be described herein can include more or fewer elements than the above-described.

In more detail, the wireless communication unit 110 among the elements can include one or more modules enabling wireless communication between the mobile terminal 100 and another mobile terminal 100, or between the mobile terminal 100 and an external server. In addition, the wireless communication 110 can include one or more modules connecting the mobile terminal 100 to one or more networks.

The wireless communication unit 110 can include at least one of a broadcast reception module 111, a mobile communication module 112, a wireless internet module 113, a short range communication module 114, and a location information module 115.

The input unit 130 can include a camera 121 or an image input unit for an image signal input, a microphone 122 or an audio input unit for an audio signal input, a user input unit 123 (e.g., a touch key, a mechanical key, etc.) for receiving information from a user. Voice data or image data collected by the input unit 120 can be analyzed and processed with user's control commands.

The sensor 140 can include at least one sensor for sensing at least one of surrounding environment information around the mobile terminal and user information. For example, the sensor 140 can include at least one selected from a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., the camera (see 121)), a microphone (see 122), a battery gauge, an environmental sensor (e.g., a barometer, a hygrometer, a thermometer, a radiation sensor, a thermal sensor, a gas detection sensor, etc.), a chemical sensor (e.g., an e-nose, a healthcare sensor, a biometric sensor, etc.). Furthermore, the mobile terminal disclosed herein can combine and use information sensed by at least two sensors among those sensors.

The output unit 150 is for generating an output related to sense of sight, sense of hearing, or sense of touch, and can include at least one selected from a display 151, an audio output unit 152, a haptic module 153, and a light output unit 154. The display 151 can form a mutually layered structure with or be formed into one with a touch sensor, and realize a touch screen. Such a touch screen may not only function as the user input unit 123 providing an input interface between the mobile terminal 100 and the user, but also provide an output interface between the mobile terminal 100 and the user.

The interface unit 160 plays a role of a passage with various kinds of external devices connected to the mobile terminal 100. This interface unit 160 can include at least one selected from a wired/wireless headset port, an external charger port, a wired/wireless data port, a memory card port, a port connecting a device having an identification module prepared therein, an audio input/output (I/O) port, a video input/output (I/O) port, and an earphone port. In the mobile terminal 100, a proper control can be performed on a connected external device in correspondence to connection between the external device and the interface unit 160.

In addition, the memory 170 stores data for supporting various functions of the mobile terminal 100. The memory 170 can store a plurality of application programs or applications driven in the mobile terminal 100, data for operations of the mobile terminal 100, and instructions. At least a part of these application programs can exist in the mobile terminal 100 at the time of release for basic functions (e.g., a call originating or receiving function, a message transmitting and receiving function). Moreover, the application programs are stored in the memory 170 and installed in the mobile terminal 100, and then can be driven to perform operations (or functions) of the mobile terminal by the controller 180.

The controller 180 typically controls overall operations of the mobile terminal 100 besides operations related to the application programs. The controller 180 can provide the user with, or process proper information or functions by processing a signal, data, or information input or output through the above-described elements, or driving the application programs stored in the memory 170.

In addition, the controller 180 can control at least a part of the elements illustrated in FIG. 4 so as to drive the application programs stored in the memory 170. Furthermore, the controller 180 can combine at least two elements among the elements included in the mobile terminal 100 and operate the combined.

The power supply unit 190 receives internal or external power under a control of the controller 180 and supplies the power to each element included in the mobile terminal 100. The power supply unit 190 includes a battery and the battery can be an embedded type battery or a replaceable battery.

At least a part of the elements can operate in cooperation with each other for realizing an operation, control, or control method of the mobile terminal according to various embodiments. In addition, the operation, control, or control method of the mobile terminal can be realized in the mobile terminal by driving at least one application program stored in the memory 170.

Hereinafter, the above-described elements are described in detail with reference to FIG. 4 before describing various embodiments realized through the mobile terminal 100. Firstly, in the wireless communication unit 110, the broadcast reception module 111 receives a broadcast signal and/or broadcast related information from an external broadcast management server through a broadcast channel. The broadcast channel can include a satellite channel or a terrestrial channel. Two or more broadcast reception modules can be provided to the mobile terminal 100 for simultaneous broadcast reception or broadcast channel switching for at least two broadcast channels.

The mobile communication module 112 can transmit and receive wireless signals to and from at least one selected from a base station, an external terminal, and a server on a mobile communication network constructed according to technical standards or communication schemes for the mobile communication (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A) etc.).

The wireless signal can include a voice call signal, a video call signal, or various types of data according to transmission and reception of a text/multimedia message. The wireless internet module 113 refers to a module for a wireless internet connection, and can be embedded in or prepared outside the mobile terminal 100. The wireless internet module 113 is configured to transmit and receive a wireless signal over a communication network conforming with wireless internet technologies.

The wireless internet technologies include, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and LTE-Advanced (LTE-A), and the wireless internet module 113 transmits and receives data according to at least one wireless internet technology within the range of including internet technology not described in the above.

From a viewpoint that an access to the wireless internet through WiBro, HSDPA, HSUPA, GSM, CDMA, WCDMA, LTE, or LTE-A is conducted through a mobile communication network, the wireless internet module 113 conducting the access to the wireless internet through the mobile communication network can be understood as a kind of the mobile communication module 112.

The short range communication module 114 is for short range communication and can support the short range communication by using at least one selected from Bluetooth™, Radio Frequency Identification (RFID), Infrared Data Association (IrDA), Ultra Wideband UWB), ZigBee, Near Field Communication (NFC), Wi-Fi, Wi-Fi Direct, and Wireless Universal Serial Bus (Wireless USB) technologies. This short range communication module 114 can support, through a wireless area network, wireless communication between the mobile communication terminal 100 and a wireless communication system, between the mobile terminal 100 and another mobile terminal 100, or between the mobile terminal 100 and a network on which the other mobile terminal 100 or an external server is located. The wireless area network can be a wireless personal area network.

Here, the other mobile terminal 100 can be a wearable device (e.g., a smart watch, a smart glass, or an HMD) through which data is mutually exchangeable (or interworkable) with the mobile terminal 100 according to an embodiment. The short range communication module 114 can detect (or recognize) a wearable device capable of communicating with the mobile terminal 100. Furthermore, if the detected wearable device is authenticated to communicate with the mobile terminal 100, the controller 180 can transmit at least a part of data processed in the mobile terminal 100 to the wearable device through the short range communication module 114. Therefore, a user of the wearable device can use the data processed by the mobile terminal 100 through the wearable device. For example, if a call is received by the mobile terminal 100, the user can perform a phone call through the wearable device, or if a message is received by the mobile terminal 100, the user can check the received message through the wearable device.

The location information module 115 is for obtaining a location (or a current location) of the mobile terminal. As a representative example thereof, there is a global positioning system (GPS) module or a Wi-Fi module. For example, if adopting the GPS module, the mobile terminal can obtain a location of the mobile terminal by using a signal transmitted from a GPS satellite. In another example, if adopting the Wi-Fi module, the mobile terminal can obtain the location of the mobile terminal based on information on a wireless access point (AP) transmitting or receiving a wireless signal with the Wi-Fi module. If necessary, the location information module 115 can additionally or alternatively perform any one function among other modules in the wireless communication unit 110 in order to obtain data about the location of the mobile terminal. The location information module 115 is a module used for obtaining the location (or current location) of the mobile terminal, and is not limited to a module directly calculating or obtaining the location of the mobile terminal.

Next, the input unit 120 is for receiving image information (or an image signal), audio information (or an audio signal), data, or information input from the user. The mobile terminal 100 can include one or a plurality of cameras 121 for an input of image information. The camera 121 processes an image frame such as a still image or video obtained by an image sensor in a video call mode or an image capturing mode. The processed image frame can be displayed on the display 151 or stored in the memory 170. Furthermore, the plurality of cameras 121 prepared in the mobile terminal 100 can be arranged to form a matrix structure, and, through the cameras 121 forming this matrix structure, a plurality of pieces of information on images having different angles or different focuses can be input to the mobile terminal 100. In addition, the plurality of cameras 121 can be arranged in a stereo structure to obtain left and right images for realizing a stereoscopic image.

The microphone 122 can process an external sound signal as electrical voice data. The processed voice data can be variously used according to a function (or an application program) being performed in the mobile terminal 100. Furthermore, various noise removal algorithms can be implemented for removing noise generated in a process for receiving the external sound signal.

The user input unit 123 is for receiving information from the user. If information is input through the user input unit 123, the controller 180 can control an operation of the mobile terminal 100 in correspondence to the input information. This user input unit 123 can include a mechanical input unit (or mechanical key, for example, buttons positioned on the front and rear surfaces or on the side surfaces, a dome switch, a jog wheel, or a jog switch, etc.) and a touch type input unit. As an example, the touch type input unit can be configured with a virtual key displayed on a touch screen through a software processing, a soft key, or a visual key, or a touch key disposed on a portion other than the touch screen. In addition, the virtual key or the visual key is possibly displayed on the touch screen in various types and, for example, can be configured with graphics, texts, icons, videos, or a combination thereof.

Furthermore, the sensor 140 can sense at least one of environmental information surrounding the mobile terminal 100 and user information, and generate a sensing signal corresponding to the sensed information. The controller 180 can control driving or operations of the mobile terminal 100, or perform data processing, a function, or an operation related to an application program installed in the mobile terminal 100, based on the sensing signal. Hereinafter, representative sensors among various sensors that can be included in the sensor 140 are described in detail.

Firstly, the proximity sensor 141 refers to a sensor detecting presence of an object accessing or around a predetermined detecting surface by using an electromagnetic force or an infrared ray without a mechanical contact. This proximity sensor 141 can be disposed in an internal area of the mobile terminal surrounded by the above-described touch screen or around the touch screen.

As an example of the proximity sensor 141, there is a transmissive optoelectronic sensor, a diffuse optoelectronic sensor, a high frequency oscillating proximity sensor, a capacitive proximity sensor, an inductive proximity sensor, or an infrared proximity sensor. If the touch screen is capacitive type, the proximity sensor 141 can be configured to detect an access of an object having conductivity by a change of an electric field according to the access of the object. In this instance, the touch screen (or a touch sensor) itself can be classified into a proximity sensor.

Moreover, for convenience of explanation, a behavior that an object is in proximity to the touch screen without contacting the touch screen and is allowed to be recognized as if the object is on the touch screen is referred to as a "proximity touch". A behavior that an object actually contacts the touch screen is referred to as a "contact touch". A position at which an object is subject to a proximity touch over the touch screen means a position at which the object vertically corresponds to the touch screen if the object is subject to the proximity touch.

The proximity sensor 141 can detect a proximity touch and a proximity touch pattern (e.g., a proximity touch distance, a proximity touch direction, a proximity touch speed, a proximity touch time, a proximity touch position, a proximity touch shift state, etc.). Furthermore, the controller 180 can process data (or information) corresponding to a proximity touch action and the proximity touch pattern detected through the proximity sensor 141 and, in addition, can output visual information corresponding to the processed data on the touch screen. In addition, the controller 180 can control the mobile terminal 100 so that different operations or different data (or information) are processed according to whether a touch for an identical point on the touch screen is a proximity touch or a contact touch.

The touch sensor senses a touch (or a touch input) applied to the touch screen (or the display 151) by using at least one of various touch schemes including a resistive-film scheme, a capacitive scheme, an infrared ray scheme, an ultrasonic scheme, and a magnetic field scheme. As an example, the touch sensor can be configured to convert a change in pressure applied to a specific part or a change in capacitance generated at a specific part of the touch screen into an electrical input signal. The touch sensor can be configured to detect a position or an area thereon which is touched by a touch object touching the touch screen, or pressure or capacitance at the time of the touch. Here, the touch object can be an object applying a touch on the touch sensor, for example, a finger, a touch pen, a stylus pen, or a pointer.

In this way, if there is a touch input on the touch sensor, a signal (signals) corresponding thereto is (are) transmitted to a touch controller. The touch controller processes the signal(s) and transmits corresponding data to the controller 180. Accordingly, the controller 180 can know which area of the display 151 is touched. Here, the touch controller can be a separate element other than the controller 180, or be the controller itself.

Furthermore, the controller 180 can perform different controls or an identical control according to a kind of the touch object, which touches the touch screen (or a touch key prepared other than the touch screen). Whether to perform different controls or an identical control according to a kind of the touch object can be determined according to a current operation state of the mobile terminal 100 or an application program being executed.

The above-described touch sensor and proximity sensor can sense independently or in a combined manner various types of touches on the touch screen, wherein the touches include a short (or a tap) touch, a long touch, a multi-touch, a drag touch, a flick touch, a pinch-in touch, a pinch-out, a swipe touch, and a hovering touch.

The ultrasonic sensor can recognize position information on a touch object by using an ultrasonic wave. The controller 180 can calculate a position of a wave generating source through information sensed by an optical sensor and a plurality of ultrasonic sensors. The position of the wave generating source can be calculated by using a property that a light is very faster than the ultrasonic wave, in other words, a time that a light arrives at an optical sensor is very shorter than a time that an ultrasound wave arrives at an ultrasonic sensor. In more detail, the position of the wave generating source can be calculated by using a time difference from a time if an ultrasonic wave arrives with a light considered as a reference signal.

Furthermore, from a view of a configuration of the input unit 120, the camera 121 includes at least one selected from a camera sensor (e.g., a CCD, or a CMOS sensor), a photo sensor (or an image sensor), and a laser sensor. The camera 121 and the laser sensor can be combined together and sense a touch of the sensing target for a 3-dimensional stereoscopic image. The photo sensor can be stacked on a display element, and this photo sensor scans a movement of the sensing target close to the touch screen. In more detail, the photo sensor includes photo diodes and transistors in rows/columns and scans a target mounted on the photo sensor by using an electrical signal changed according to an amount of a light applied to the photo diodes. In other words, the photo sensor performs coordinate calculation on the sensing target according to a change amount of the light and, through this, position information on the sensing target can be obtained.

The display 151 displays (outputs) information processed by the mobile terminal 100. For example, the display 151 can display execution screen information on the application program driven in the mobile terminal 100 or user interface (UI) information or graphic user interface (GUI) information according to the execution screen information.

In addition, the display 151 can be configured as a stereoscopic display displaying a stereoscopic image. A 3-dimensional display scheme such as a stereoscopic scheme (glasses type), an autostereoscopic scheme (glassless type), or a projection scheme (a holographic scheme) can be applied to the stereoscopic display.

The sound output unit 152 can output audio data received from the wireless communication unit 110 or stored in the memory 170 in a call signal reception mode, a call mode or a recording mode, a speech recognition mode, or in a broadcast reception mode. The sound output unit 152 can output a sound signal related to a function (e.g., a call signal reception sound, or a message reception sound, etc.) performed in the mobile terminal 100. This sound output unit 152 can include a receiver, a speaker, or a buzzer, etc.

The haptic module 153 can generate various tactile effects that the user can feel. A representative example of the tactile effect that is generated by the haptic module 153 can be vibration. Strength and a pattern of the vibration generated by the haptic module 153 can be controlled by user selection or setting by the controller. For example, the haptic module 153 can output different vibrations sequentially or by synthesizing them.

Besides the vibration, the haptic module 153 can generate various tactile effects including an effect by a stimulus such as a pin array moving vertically to a contact skin surface, a air discharge force or air absorptive power through an outlet or an inlet, brush against a skin surface, contact to an electrode, or static electricity, and an effect by reproducing a cold and warmth sense by using a device that heat absorption or heating is enabled.

The haptic module 153 can be implemented to transfer the tactile effect through a direct contact, and can also be implemented for the user to feel the tactile effect through a muscle sense of a finger or an arm. The haptic module 153 can be prepared two or more in number according to a configuration aspect of the mobile terminal 100.

The optical output unit 154 can output a signal for notifying an event occurrence by using a light from an optical source of the mobile terminal 100. The event occurred in the mobile terminal 100 can be exemplified with message reception, call signal reception, missed calls, alarm, schedule notification, email reception, or information reception through an application.

The signal output by the optical output unit 154 is implemented according to that the mobile terminal emits a monochromatic light or a multi-chromatic light towards the front or rear surface. The signal output can be completed if the mobile terminal detects that the user checks the event.

The interface unit 160 can play a role of a passage with all external devices connected to the mobile terminal 100. The interface unit 160 can receive data from the external device, receive power and transfer the power to each element inside the mobile terminal 100, or allow internal data of the mobile terminal 100 to be transmitted to the external device. For example, the interface 160 can include a wired/wireless headset port, an external charger port, a wired/wireless data port, a memory card port, a port connecting a device that an identification module is prepared, an audio input/output (I/O) port, a video input/output (I/O) port, or an earphone port, etc.

Furthermore, the identification module is a chip storing various pieces of information for authenticating user's authority for the mobile terminal 100 and can include a user identify module (UIM), a subscriber identity module (SIM), or a universal subscriber identity module (USIM). A device including the identification module (hereinafter, an 'identification device') can be manufactured in a smart card type. Accordingly, the identification device can be connected to the mobile terminal 100 through the interface unit 160.

In addition, if the mobile terminal 100 is connected to an external cradle, the interface unit 160 can be a passage through which power is supplied from the cradle to the mobile terminal 100 or a passage through which various command signals input from the cradle by the user are delivered. The various command signals or the power input from the cradle can operate as signals for perceiving that the mobile terminal 100 is accurately mounted in the cradle.

The memory 170 can store a program for operations of the controller 180 and temporarily store input/output data (e.g., a phone book, messages, still images, videos, etc.). The memory 170 can store data about vibrations of various patterns and sounds at the time of a touch input on the touch screen.

The memory 170 can include at least one storage medium type among a flash memory type, a hard disk type, a Solid State Disk (SSD) type, a Silicon Disk Drive (SDD) type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc. The mobile terminal 100 can operate in relation to a web storage performing a storage function of the memory 170 over the internet.

Furthermore, as described above, the controller 180 normally controls overall operations and an operation related to an application program of the mobile terminal 100. For example, if a state of the mobile terminal satisfies a set condition, the controller 180 executes or releases a lock state that limits an input of a user's control command to applications.

In addition, the controller 180 can perform a control or a process related to a voice call, data communication, or a video call, etc., or can perform a pattern recognition processing for recognizing a written input and a drawing input performed on the touch screen as a character and an image, respectively. Furthermore, the control 180 can combine and control any one of or a plurality of the above-described elements in order to implement various embodiments to be described below in the mobile terminal 100.

The power supply unit 190 receives external or internal power under a control of the controller 180 and supplies power necessary for operating each element. The power supply unit 190 includes a battery. The battery can be an embedded battery that is rechargeable and can be detachably coupled for charging.

The power supply unit 190 can include a connection port, and the connection port can be configured as an example of the interface 160 to which an external charger providing power is electrically connected for charging the battery. As another example, the power supply unit 190 can be configured to charge the battery in a wireless manner without using the connection port. In this instance, the power supply unit 190 can receive, from an external wireless power transmitting device, power by using one or more of an inductive coupling manner based on a magnetic induction phenomenon and a magnetic resonance coupling manner based on an electromagnetic resonance phenomenon. Hereinafter, various embodiments can be implemented in a recording medium that is readable with a computer or a similar device by using software, hardware, or a combination thereof.

Next, description is made about a communication system realizable through the mobile terminal 100 according to an embodiment. Firstly, the communication system can use different wireless interfaces and/or a physical layer. For example, the wireless interface available by the communication system can include Frequency Division Multiple Access (FDMA), Time Division Multiple Access (TDMA), Code Division Multiple Access (CDMA), Universal Mobile Telecommunications Systems (UMTS)(in particular, Long Term Evolution (LTE), or Long Term Evolution-Advanced (LTE-A)), Global System for Mobile Communications (GSM), or etc.

Hereinafter, for convenience of explanation, description is made limitedly to CDMA. However, it is obvious that the embodiments can be applied to all communication systems including an Orthogonal Frequency Division Multiplexing (OFDM) wireless communication system as well as a CDMA wireless communication system.

The CDMA wireless communication system can include at least one terminal 100, at least one base station (BS, also can be referred to as Node B or Evolved Node B), at least one BS controller (BSC) and a mobile switching center (MSC). The MSC can be configured to be connected to the Public Switched Telephone Network (PSTN) and BSCs. The BSCs can be connected to the BS in pair through a backhaul line. The backhaul line can be prepared according to at least one selected from E1/T1, ATM, IP, PPP, Frame Relay, HDSL, ADSL, and xDSL. Accordingly, the plurality of BSCs can be included in a CDMA wireless communication system.

Each of a plurality of BSs can include at least one sector, and each sector can include an omni-directional antenna or an antenna indicating a specific radial direction from the BS. In addition, each sector can include two or more antennas having various types. Each BS can be configured to support a plurality of frequency allocations and each of the plurality of allocated frequencies can have specific spectrum (e.g., 1.25 MHz, or 5 MHz).

An intersection between the sector and the frequency allocation can be called as a CDMA channel. The BS can be called as a base station transceiver subsystem (BTSs). In this instance, one BSC and at least one BS are called together as a "base station". The base station can also represent a "cell site". In addition, each of a plurality of sectors for a specific BS can also be called as a plurality of cell sites.

A broadcasting transmitter (BT) transmits a broadcast signal to terminals 100 operated in a system. The broadcast reception module 111 illustrated in FIG. 4 is prepared in the terminal 100 for receiving the broadcast signal transmitted by the BT.

Furthermore, in the CDMA wireless communication system, a global positioning system (GPS) can be linked for checking a location of the mobile terminal 100. A satellite is helpful for grasping the location of the mobile terminal. Useful location information can be obtained by less than two or at least two satellites. Here, the location of the mobile terminal 100 can be tracked by using all techniques, which are capable of tracking the location, as well as a GPS tracking technique. In addition, at least one of GPS satellites can be selectively or additionally responsible for transmitting satellite digital multimedia broadcasting (DMB).

The location information module 115 prepared in the mobile terminal 100 is for detecting, operating or identifying the location of the mobile terminal 100, and can representatively include a GPS module and a WiFi module. If necessary, the location information module 115 can alternatively or additionally perform any function of other modules in the wireless communication unit 110 for obtaining data for the location of the mobile terminal 100.

The GPS module 115 can precisely calculate 3D current location information according to latitude, longitude, and altitude by calculating distance information from three or more satellites and precise time information, and by applying a trigonometry to the calculated information. A method is currently widely used that calculates location and time information using three satellites, and corrects an error in the calculated location and time information using another satellite. The GPS module 115 can calculate speed information by continuously calculating a current location in real time. However, it is difficult to precisely measure the location of the mobile terminal 100 by using the GPS module in a dead zone, such as an indoor area, of the satellite signal. Accordingly, in order to compensate for location measurement in the GPS manner, a WiFi positioning system (WPS) can be used.

The WPS is a technique for tracking the location of the mobile terminal 100 using a WiFi module prepared in the mobile terminal 100 and a wireless access point (AP) transmitting or receiving a wireless signal to or from the WiFi module, and can mean a location measurement technique based on a wireless local area network (WLAN) using WiFi.

The WPS can include a WiFi positioning server, the mobile terminal 100, a wireless AP connected to the mobile terminal 100, and a database storing arbitrary wireless AP information. The mobile terminal 100 connected to the wireless AP can transmit a location information request message to the WiFi positioning server.

The WiFi positioning server extracts information on the wireless AP connected to the mobile terminal 100 based on the location information request message (or a signal) of the mobile terminal 100. The information on the wireless AP connected to the mobile terminal 100 can be transmitted to the WiFi positioning server through the mobile terminal 100 or transmitted to the WiFi positioning server from the wireless AP.

The information on the wireless AP, which is extracted based on the location information request message of the mobile terminal 100, can be at least one selected from a MAC address, a Service Set Identification (SSID), a Received Signal Strength Indicator (RSSI), Reference Signal Received Power (RSRP), Reference Signal Received Quality (RSRQ), channel information, Privacy, a Network Type, Signal Strength, and Noise Strength.

As described above, the WiFi positioning server can receive information on the wireless AP connected to the mobile terminal 100, and extract wireless AP information corresponding to the wireless AP to which the mobile terminal is being connected from the pre-constructed database. In addition, information on arbitrary wireless APs, which is stored in the database, can be information on a MAC Address, an SSID, channel information, Privacy, a Network Type, latitudinal and longitudinal coordinates of a wireless AP, a building name and floor on which the wireless AP is located, indoor detailed location information (GPS coordinates available), an address of an owner of the wireless AP, a phone number, and etc. In addition, in order to remove a wireless AP provided by using a mobile AP or an illegal MAC address in the location measurement process, the WiFi positioning server can extract a predetermined number of pieces of wireless AP information in the descending order of an RSSI.

Thereafter, the WiFi positioning server can extract (or analyze) location information on the mobile terminal 100 by using at least one piece of wireless AP information extracted from the database. The location information of the mobile terminal 100 is extracted (or analyzed) by comparing the stored and the received wireless AP information.

As a method of extracting (or analyzing) location information on the mobile terminal 100, a cell-ID method, a fingerprint method, a trigonometry, and a landmark method can be used. The cell-ID method is a method of determining a location of a wireless AP having strongest strength from among surrounding wireless AP information collected by a mobile terminal. This method is advantageous in that implementation is simple, an additional cost is not necessary, and location information can be rapidly obtained. However, if installation intensity of a wireless AP is lower, positioning precision becomes lowered.

The fingerprint method is a method of selecting a reference location in a service area, collecting signal strength information, and estimating a location through signal strength information transmitted from a mobile terminal based on the collected information. In order to use the fingerprint method, it is necessary to construct a database for propagation characteristics in advance.

The trigonometry is a method of operating a location of a mobile terminal based on a distance between coordinates of at least three wireless APs and the mobile terminal. For estimating the distances between the mobile terminal and the wireless APs, signal strength is converted into distance information, or a time of arrival (ToA) of a wireless signal, a time difference of arrival (TDoA) of a wireless signal, an angle of arrival (AoA) of a wireless signal can be used.

The landmark method is a method of measuring a location of a mobile terminal by using a landmark transmitter. Besides the above-described methods, various algorithms can be used for extracting (or analyzing) location information on a mobile terminal. The location information on the mobile terminal 100 extracted in this way can be transmitted to the mobile terminal 100 through the WiFi positioning server and the mobile terminal 100 can obtain the location information.

The mobile terminal 100 can obtain location information by being connected to at least one wireless AP. In addition, the number of wireless APs requested for obtaining the location information on the mobile terminal 100 can be variously varied according to a wireless communication environment in which the mobile terminal 100 is located.

Various embodiments of a method for operating the flexible display device 200 will be described. The embodiments can be applied to both the stretchable display device 200_1 described above with reference to FIGS. 2A and 2B and the rollable display device 200_2 described above with reference to FIGS. 3A to 3F. Furthermore, an embodiment is also applicable to a foldable display device of which a screen can be folded.

Figure 5:
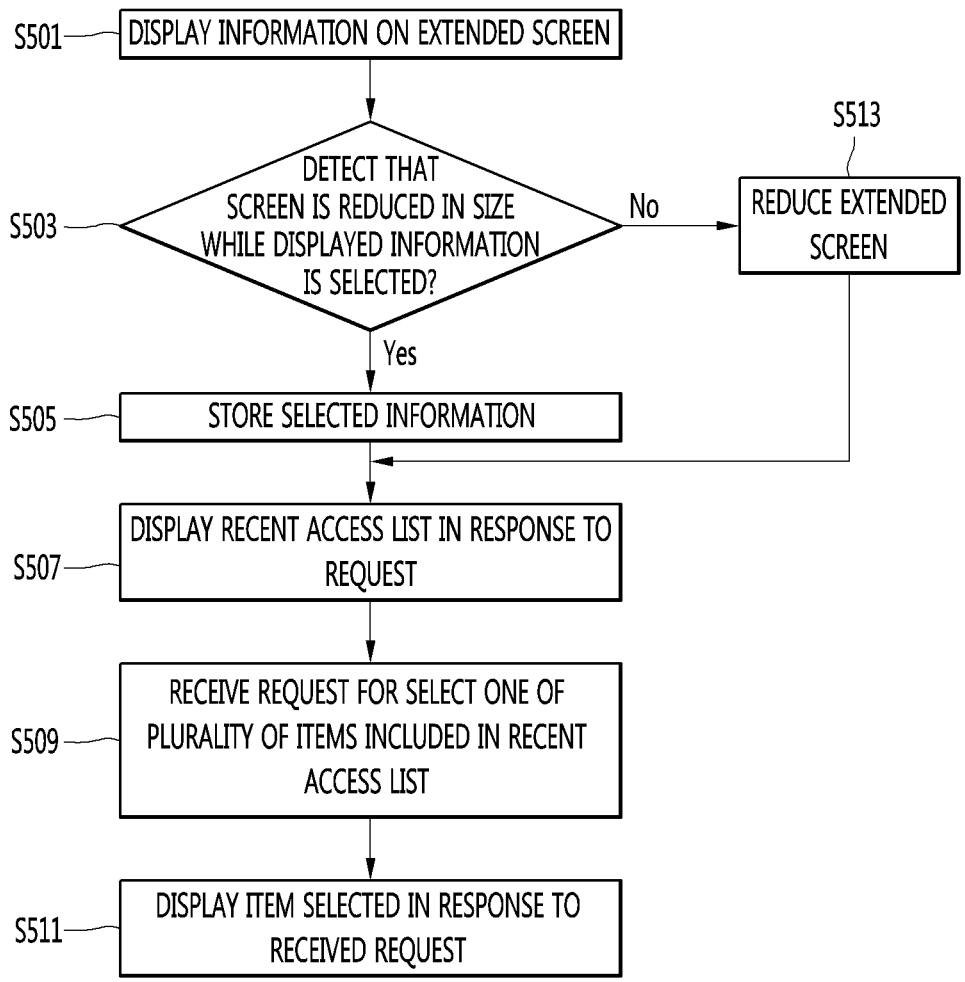
FIG. 5 is a flowchart illustrating a method for operating a flexible display device according to an embodiment.

FIG. 5 is a flowchart illustrating a method for operating a flexible display device according to another embodiment. The controller 290 displays information on an extended screen of the display 250 (S501). In one embodiment, the screen of the display 250 can be extended by as much as a size of a plurality of regions. Each of the plurality of regions can have the same size. The plurality of regions can be individually controlled. That is, respective inputs to the plurality of regions may not affect other regions.

For example, if an execution window of an email application is displayed on a first region and an execution window of an Internet application is displayed on a second region, if a link included in the execution window of the Internet application is selected, the controller 290 can maintain the execution window of the email application displayed on the first region, while switching the execution window of the Internet application displayed on the second region to a website window corresponding to the selected link. The plurality of regions that form the extended screen can include different information.

In one embodiment, the information displayed on the extended screen can be any one of an execution screen of an application and multimedia content, but this is merely an example. The controller 290 determines whether the extended screen is reduced in size while the displayed information is selected (S503). In one embodiment, a request for selecting the information displayed on the extended screen can be made by a touch input, but this is merely an example. The controller 290 can detect whether the size of the screen is reduced while any one of the plurality of regions forming the extended screen is selected. The controller 290 can detect, via the sensor 210, whether the size of the screen is reduced.

When the extended screen is reduced in size while the displayed information is selected, the controller 290 stores the selected information via the memory 270 (S505). In one embodiment, if detecting reduction of the size of the extended screen while the displayed information is selected, the controller 290 can store the selected information in the memory 270.

In another embodiment, when one of the plurality of regions included in the extended screen is reduced and disappears while information included in the one of the plurality of regions is selected, the controller 290 can store the selected information in the memory 270.

In one embodiment, when the size of the extended screen is reduced while the displayed information is selected, the controller 290 can capture the selected information and can store a captured image. For example, the controller 290 can capture a region including the selected information by using a screen capture function to store a captured image.

The controller 290 can add stored information to a recent access list. The recent access list provides information on an application recently executed, information on a broadcast program recently viewed, and information on content recently played through the flexible display device 200. The controller 290 displays the recent access list including a plurality of items in response to a request (S507). In one embodiment, the request for displaying the recent access list can be a command of selecting a menu button 681 included in a key input region 680.

In another embodiment, the request for displaying the recent access list can be a command of selecting a function button provided to the intermediate case 220. In one embodiment, the recent access list can include at least one execution item corresponding to an application recently executed and at least one storage item corresponding to an execution window of an application recently stored. Further, the at least one storage item can correspond to an image captured and stored. In another embodiment, each of the at least one storage item can be an execution window of a stored application.

Operations S501 to S507 are described below with reference to the following figures. The following description is provided below assuming the flexible display device 200 is a rollable display device, but this is merely an example.

Figure 6B:
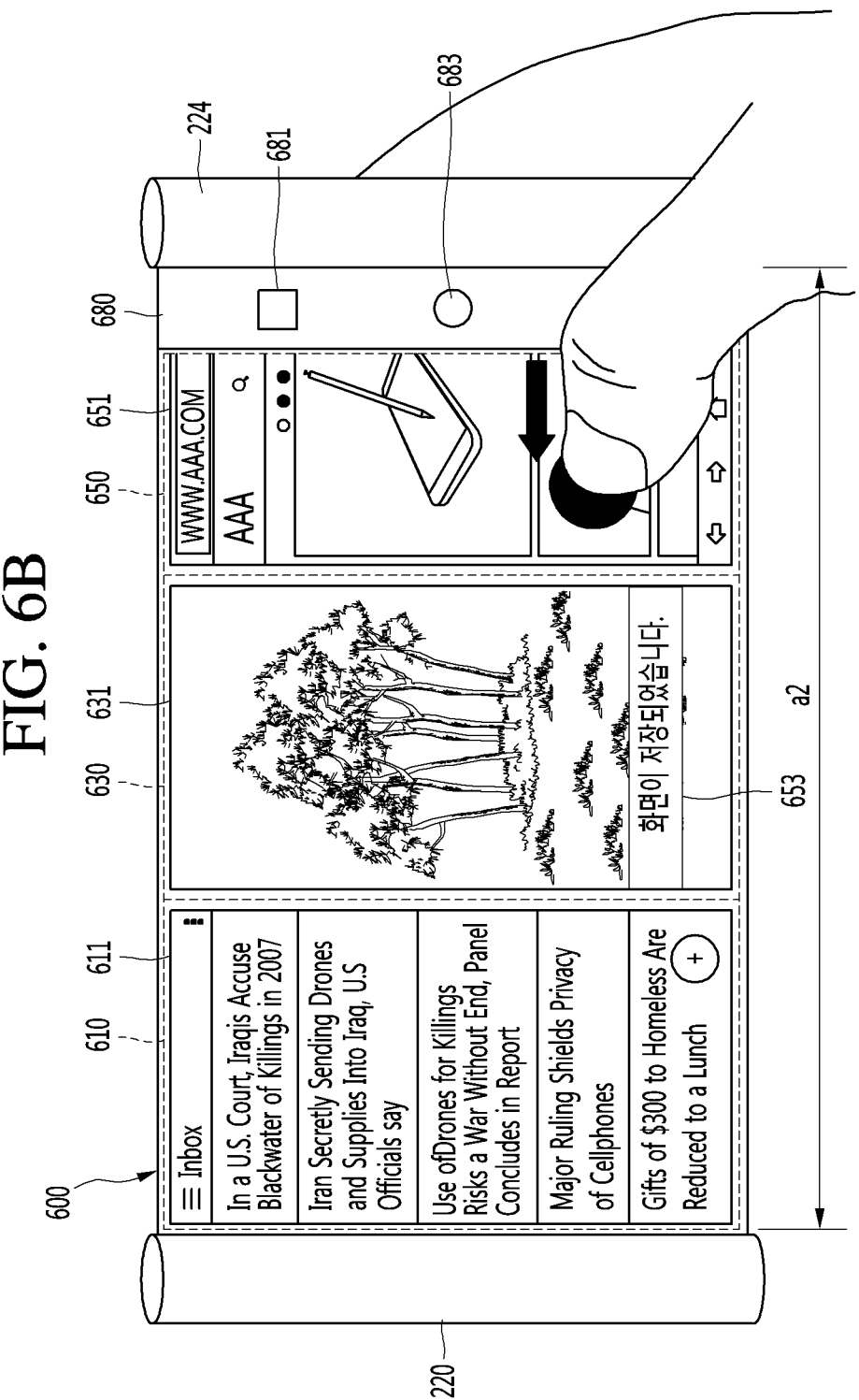

FIGS. 6A to 6E are diagrams illustrating an exemplary process in which selected information is stored if information displayed on an extended screen is selected and the screen is reduced. In particular, FIG. 6A illustrates a screen 600 of the display 250 of the flexible display device 200. The screen 600 can include a plurality of regions 610, 630, and 650. Each of the plurality of regions 610, 630, and 650 can have the same size. That is, each of the plurality of regions 610, 630, and 650 can have the same extended distance b1.

For example, the screen 600 can correspond to a screen of the display 250 extended by as much as a region corresponding to a distance a1. That is, the screen 600 can be in a state of being extended by as much as the first region 610, the second region 630, and the third region 650. However, an embodiment is not limited thereto, and the screen 600 can be in a state of being extended only by as much as the second region 630 and the third region 650. That is, the first region 610 included in the screen 600 can be a region representing a state prior to deformation of the screen of the display 250.

The screen 600 can include the key input region 680 in addition to the plurality of regions 610, 630, and 650. The key input region 680 can be a region for controlling the screen 600 according to a touch input. The key input region 680 can include a home button 683 for moving to a home screen, a back button 685 for returning to a previous screen, and the menu button 681 for editing information displayed on the screen.

An execution window 611 of an email application can be displayed on the first region 610, an execution window 631 of a gallery application can be displayed on the second region 630, and an execution window 651 of an Internet application can be displayed on the third region 650. The execution window 651 of the Internet application can correspond to a specific website address. Each execution window of the applications can include at least one piece of content.

When reduction of the extended screen 600 is detected while the execution window 651 of the Internet application included in the third region 650 is selected, as illustrated in FIG. 6B, the controller 290 can store the execution window 651 of the Internet application.

In one embodiment, the controller 290 can capture the execution window 651 of the Internet application to store a captured image. In another embodiment, the controller 290 can store the execution window 651 of the Internet application itself. Thereafter, the user can call the execution window 651 to access a specific website through the Internet application. The controller 290 can display, on the screen 600, a popup window 653 indicating that the execution window 651 of the Internet application has been stored.

Figure 6C:
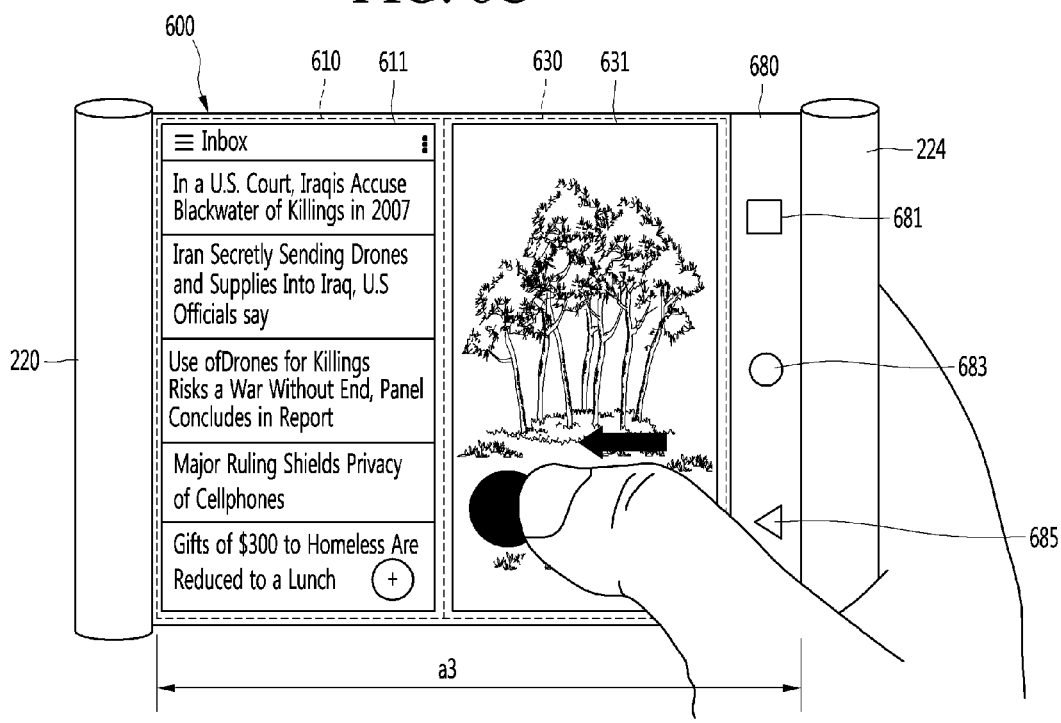

FIG. 6C illustrates a state in which the screen 600 is reduced by as much as the third region 650. If the controller 290 detects reduction of the screen 600 while the execution window 631 of the gallery application displayed on the second region 630 is selected, the controller 290 can store the execution window 631 of the gallery application. That is, the controller 290 can capture the execution window 631 of the gallery application to store a captured image.

In another embodiment, when the execution window 631 of the gallery application includes a plurality of images, only an image selected from among the plurality of images can be stored. That is, in this instance, the controller 290 can store a selected image alone without capturing the execution window 631 of the gallery application. The user can store selected information by reducing the screen while selecting information to be viewed at a later time, without providing an additional input such as a screen capture input.

Figure 6D:
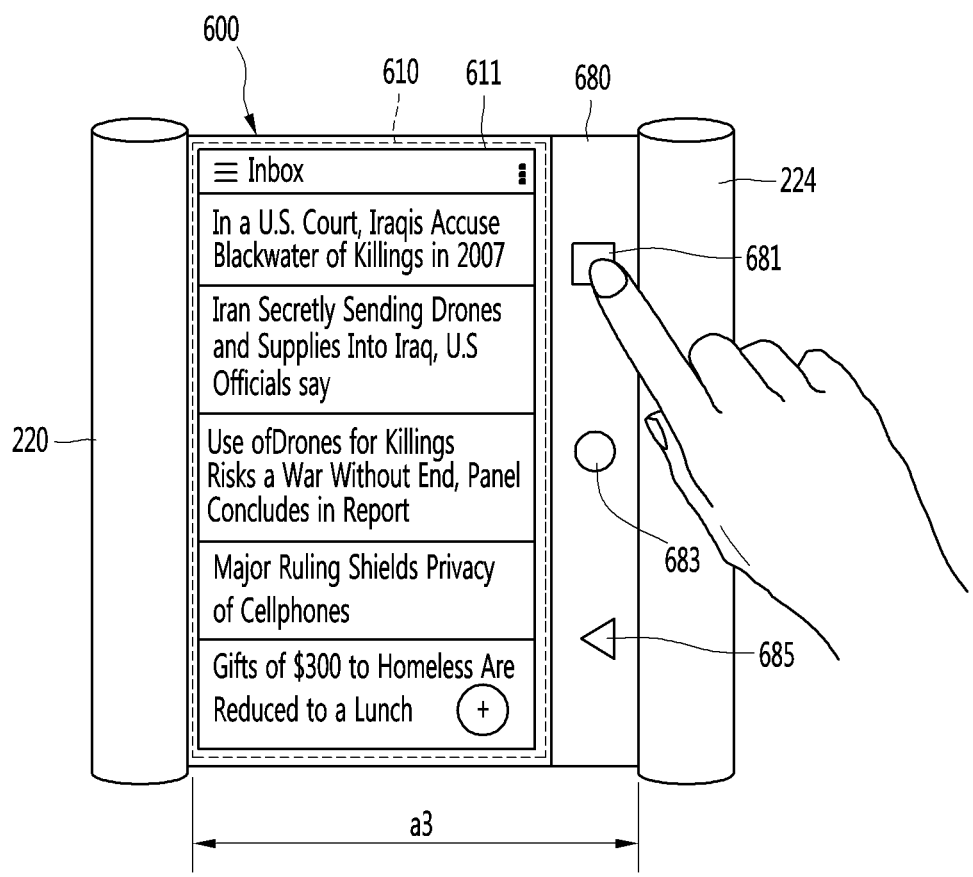
Figure 6E:
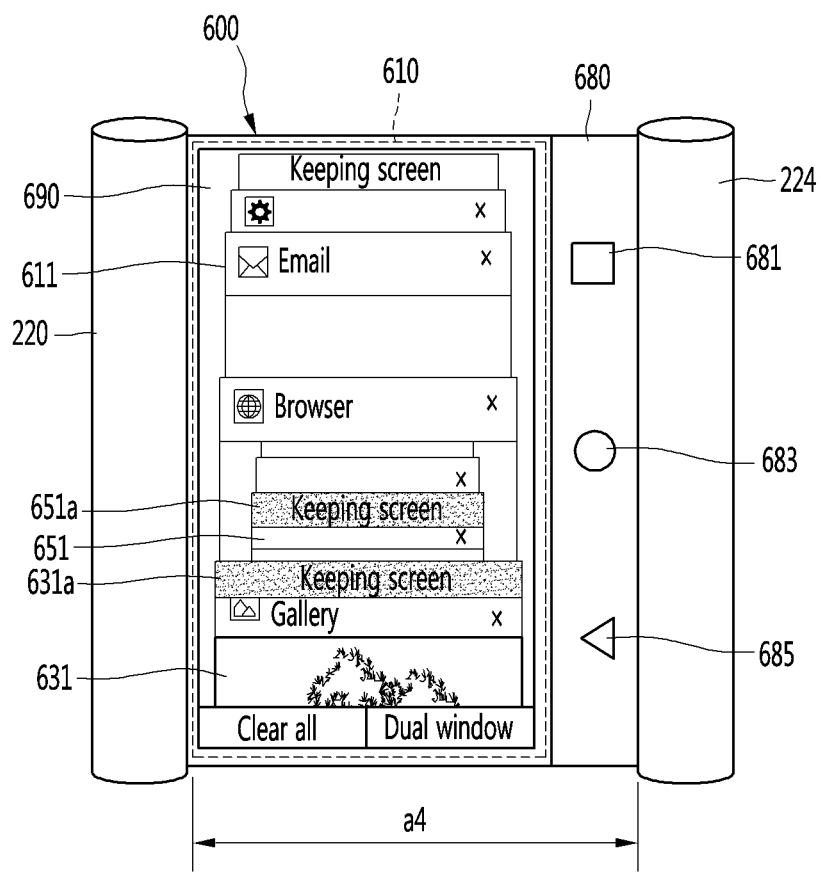

FIG. 6D illustrates a state in which the screen 600 is reduced by as much as the second region 630 and the third region 650. The screen 600 of FIG. 6D can be in a state of being extended by as much as the first region 610, but is not limited thereto and can represent a default screen prior to deformation. When the menu button 681 included in the key input region 680 is selected, the controller 290 can display a recent access list 690 on the screen 600 as illustrated in FIG. 6E. The recent access list 690 can include a plurality of items recently accessed.

The plurality of items can include the execution window 611 of the email application recently executed, and the execution window 631 of the gallery application and the execution window 651 of the Internet application stored as described above with reference to FIGS. 6A to 6C. The recent access list 690 can further include execution windows of applications recently executed.

In one embodiment, an execution window of an application stored through selection and screen reduction and an execution window of an application otherwise stored can be differently displayed. For example, an execution window of an application stored through selection and screen reduction and an execution window of an application otherwise stored can be displayed so as to be differentiated from each other by color, indicator, or the like.

In more detail, referring to FIG. 6E, single indicators 631a and 651a which read "keep screen" and indicate storage through selection and screen reduction can be displayed on the execution window 631 of the gallery application and the execution window 651 of the Internet application stored. The user can easily check information stored by the user, by virtue of the recent storage list 690. As described later, the user can easily call the stored information if necessary.

Next, FIGS. 7A to 7D are diagrams illustrating another exemplary process in which selected information is stored if information displayed on an extended screen is selected and the screen is reduced. In particular, FIGS. 7A to 7D illustrate an example in which selected information is stored if the screen 600 is reduced while the plurality of regions 610, 630, and 650 are sequentially selected from the extended screen 600.

Regarding FIG. 7A, descriptions which overlap with those of FIG. 6A are not provided below. An execution window 710 of a first shopping application, an execution window 730 of a second application, and an execution window 750 of a third shopping application are displayed on the first region 610, the second region 630, and the third region 650 respectively. That is, the user divides the extended screen 600 into three regions to perform multitasking. In more detail, this case can occur if the user compares product prices through different shopping applications with respect to one product.

When a touch input is dragged from one portion 701 on the execution window 750 of the third shopping application displayed on the third region 650 to another portion 703 on the execution window 710 of the first shopping application displayed on the first region 610 while the screen 600 is reduced, the controller 290 can store information displayed on the extended screen 600 as one screenshot. The controller 290 can store the execution window 710 of the first shopping application, the execution window 730 of the second application, and the execution window 750 of the third shopping application as one item.

Figure 7B:
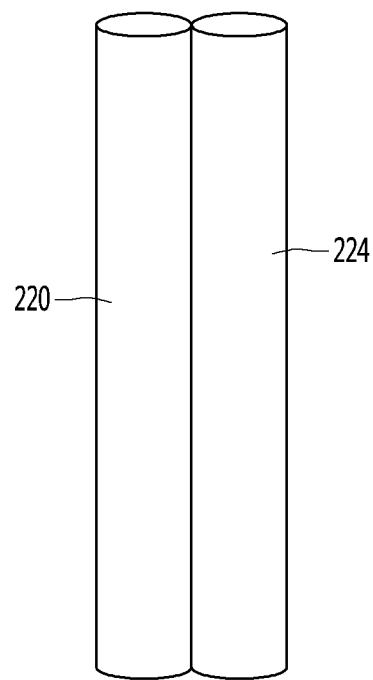
Figure 7C:
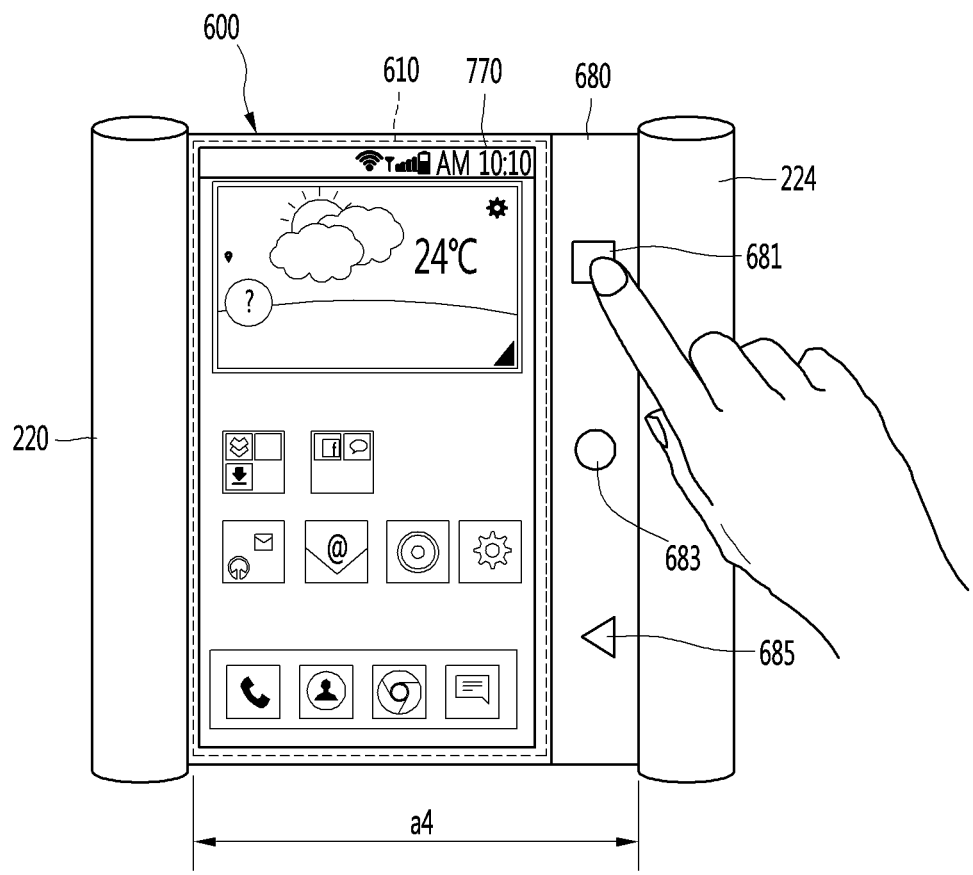

Thereafter, as illustrated in FIG. 7B, the screen of the display 250 can be in a state of not being exposed (or being closed). Thereafter, when the screen is extended by a distance a4, the controller 290 can display a home screen 770 and the key input region 680 on the extended screen 600. The distance a4 can be a sum of the distance b1 illustrated in FIG. 6A and a distance corresponding to the key input region 680.

Figure 7D:
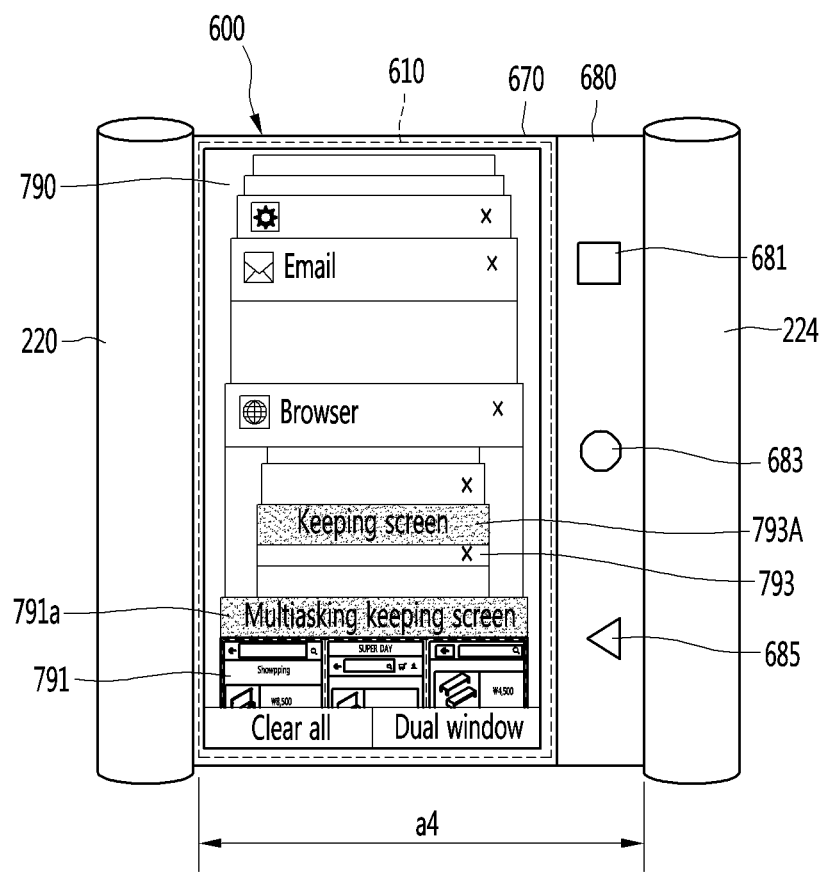

When a request for selecting the menu button 681 included in the key input region 680 is received, the controller (controller) 290 can display a recent access list 790 as illustrated in FIG. 7D. The recent access list 790 can include an item 791 stored as one screen as described above with reference to FIGS. 7A and 7B. The stored item 791 can be an image, but is not limited thereto and can be execution windows. That is, when the stored item 791 corresponds to execution windows stored as one screen, the execution windows can be displayed if the item 791 is selected. A multitasking indicator 791a, which indicates that a multitasking process has been stored as one screenshot, can be displayed on the stored item 791.

That is, the multitasking indicator 791a can indicate that information displayed on a plurality of regions which form an extended area has been stored in a batch. The multitasking indicator 791a can be differently displayed from a single indicator 793a which indicates that information displayed in one region has been stored. The single indicator 793a can indicate that an execution window 793 of an application displayed on any one of the plurality of regions 610, 630, and 650 has been stored. The multitasking indicator 791a and the single indicator 793a can be differentiated from each other by color, indicator name, or the like.

As described above, according to an embodiment, when the user performs multitasking on an extended screen, the user can store information included in a plurality of regions in a batch so that the user can easily check a stored item at a later time.

FIGS. 8A to 8D are diagrams illustrating an exemplary process in which selected information is stored in a bookmark folder or a recent access list if information displayed on an extended screen is selected and the screen is reduced.

Regarding FIG. 8A, descriptions which overlap with those of FIG. 6B are not provided below. Referring to FIG. 8A, when a part of the third region 650 is reduced while the execution window 651 of the Internet application included in the third region 650 is selected, the controller 290 can display a bookmark button 800 on the third region 650. When a subject to be stored is a website window (an execution window of an Internet application), the controller 290 can recognize this fact to display the bookmark button 800. If the third region 650 is reduced by as much as a certain region, the controller 290 can display the bookmark button 800.

Figure 8B:
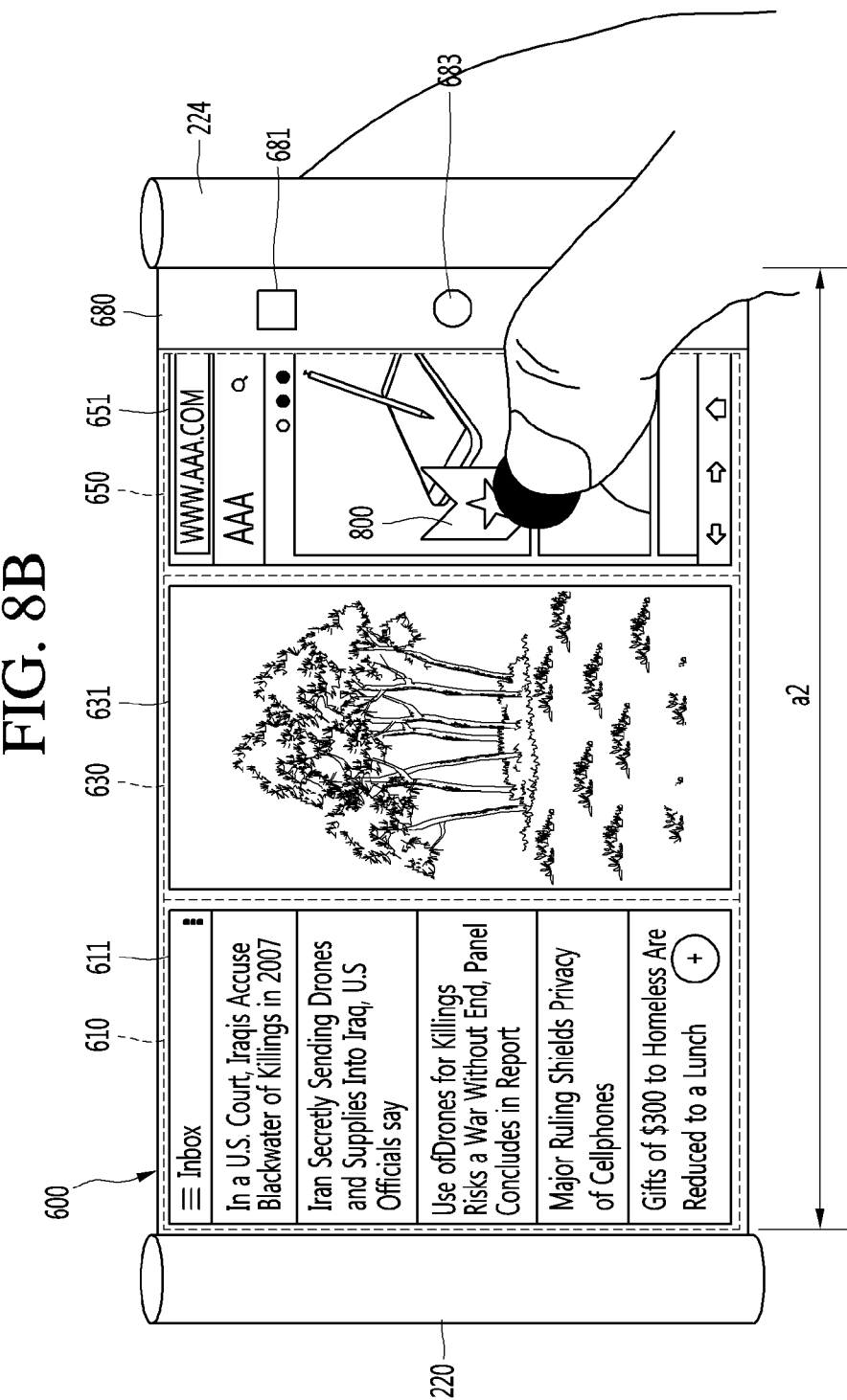
Figure 8C:
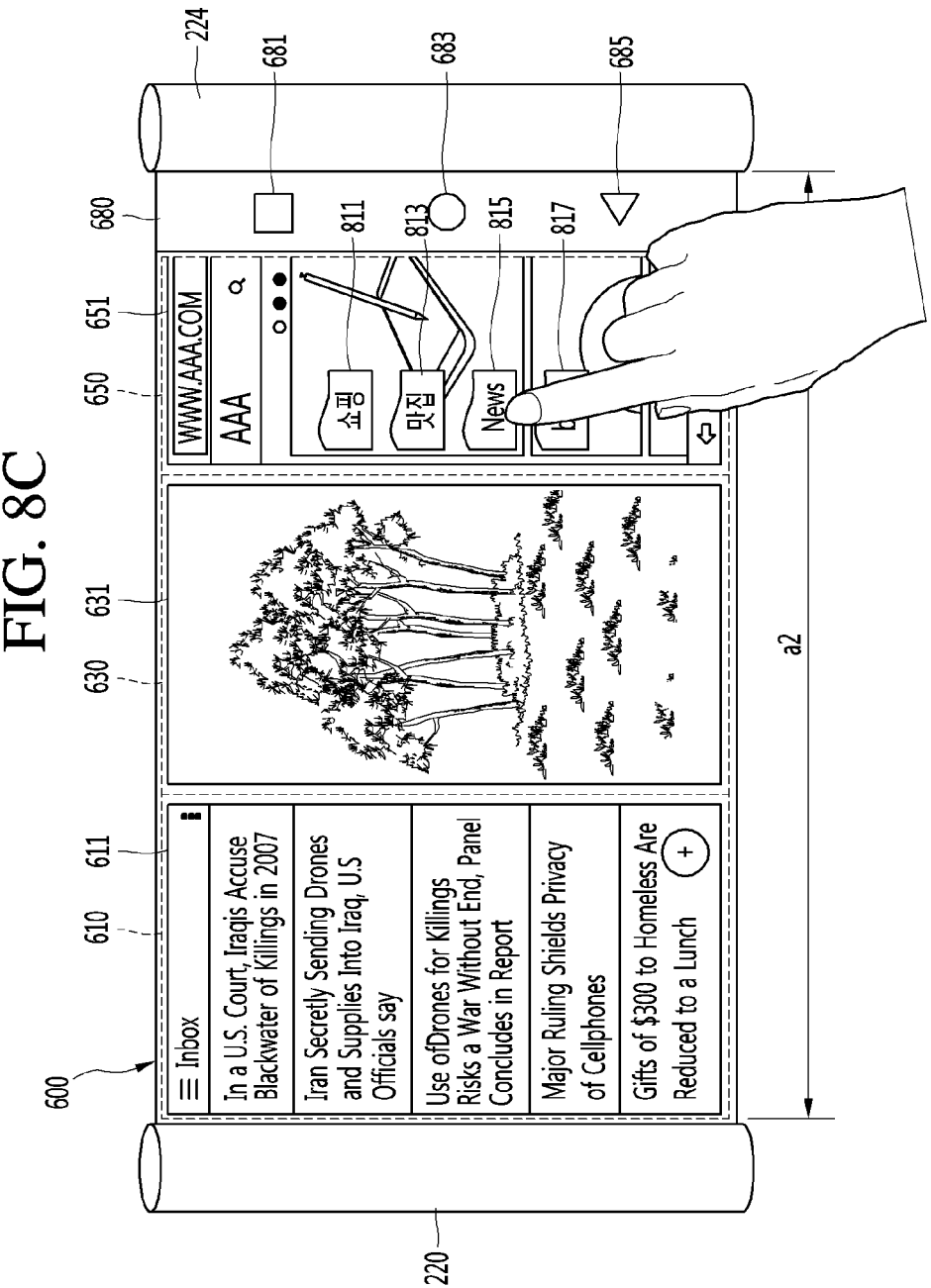

When the bookmark button 800 is selected as illustrated in FIG. 8B, the controller 290 can display a plurality of bookmark folders 811 to 817 on the third region 650 as illustrated in FIG. 8C. The plurality of bookmark folders 811 to 817 can be folders classified based on the type of a web browser accessed through the Internet application. For example, the shopping bookmark folder 811 can be a folder in which web browsers corresponding to shopping are stored. The restaurant bookmark folder 813 can be a folder in which web browsers corresponding to restaurants are stored. The news bookmark folder 815 can be a folder in which web browsers corresponding to news articles are stored.

Figure 8D:
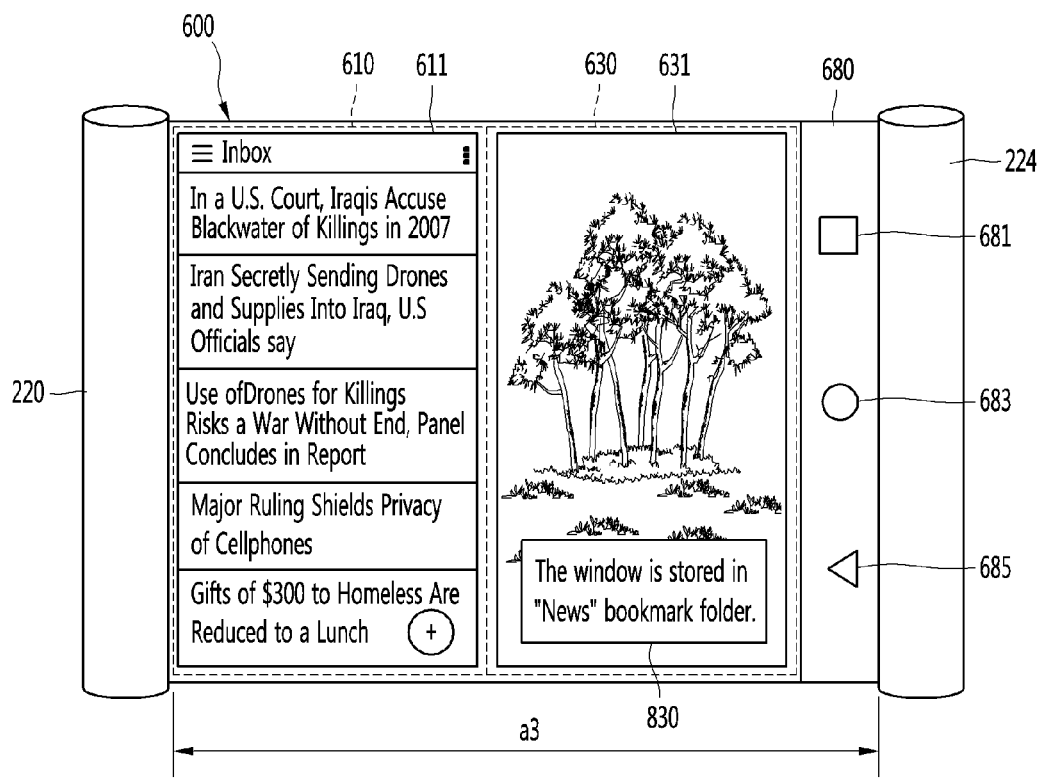

The bank bookmark folder 817 can be a folder in which web browsers corresponding to banks are stored. When the news bookmark folder 815 is selected and the entirety of the third region 650 is reduced and disappears, the controller 290 can display, on the screen 600, a popup window 830 indicating that the execution window 651 of the Internet application has been stored in the news bookmark folder 815 as illustrated in FIG. 8D. In addition, when the bookmark button 800 illustrated in FIG. 8A is not selected, the controller 290 can store the execution window 651 of the Internet application in the recent access list described above.

Figure 9C:
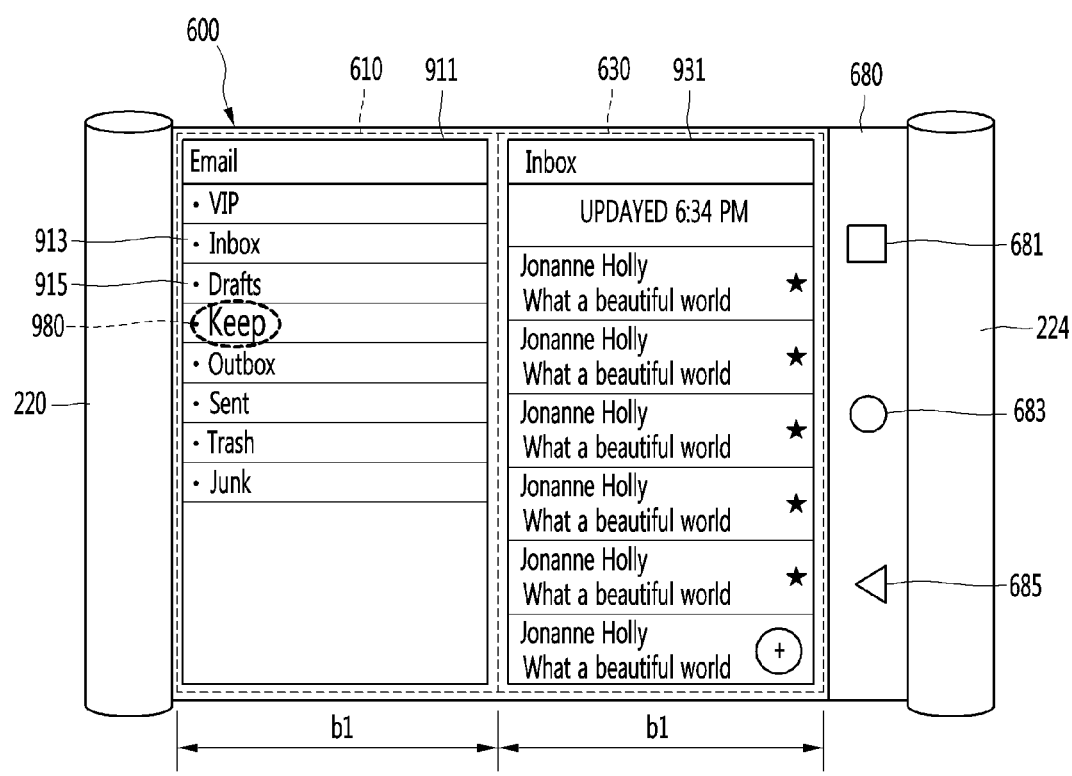

FIGS. 9A to 9C are diagrams illustrating an exemplary process in which selected information is selectively stored in a new folder or a normal folder if information displayed on an extended screen is selected and the screen is reduced. Referring to FIG. 9A, the extended screen 600 of the display 250 can include the plurality of regions 610, 630, and 650. An execution window of an email application can be displayed on the plurality of regions 610, 630, and 650.

For example, a folder window 911 for managing received emails can be displayed on the first region 610, an email list window 931 for providing emails included in a selected email folder, i.e., an inbox folder 913, from among a plurality of email folders included in the folder window 911 can be displayed on the second region 630, and an email contents window 951 for providing detailed contents of an email selected from among a plurality of emails included in the email list window 931 can be displayed on the third region 650. It is assumed that the folder window 911 includes the inbox folder 913 and a draft folder 915 for storing email drafts.

The controller 290 can detect that a part of the third region 650 is reduced while the email contents window 951 displayed on the third region 650 is selected. As illustrated in FIG. 9B, the controller 290 can display a keep folder icon 970 indicating that the selected email contents window 951 is storable in the draft folder. When the keep folder icon 970 is selected and the screen 600 is reduced by as much as an entire size of the third region 650, the controller 290 can generate a keep folder 980 as a subfolder of the draft folder 915. The selected email contents window 951 can be stored in the keep folder 980. FIG. 9C illustrates that the keep folder 980 is generated as a subfolder of the draft folder 915 in the folder window 911.

In addition, an email not stored through the keep folder icon 970 can be stored in the draft folder 915 itself. For example, the email contents window 651 stored in response to selection of the back button 685 in FIG. 9A can be stored in the draft folder 915 itself.

Next, an item stored through a process of information selection and screen reduction and a recent access list including an item corresponding to an application recently executed will be described. FIGS. 10A to 10F are diagrams illustrating a recent access list according to various embodiments.

It is assumed hereinafter that a screen 1000 of the display 250 only includes the first region 610 and the key input region 680. The key input region 680 can be displayed so as to overlap the first region 610. The key input region 680 can also be displayed in response to an additional request after not being displayed. The controller 290 can display the recent access list on the screen 1000 in response to a display request. The recent access list can provide information on an application recently executed by the user and information recently stored.

Figure 10A:
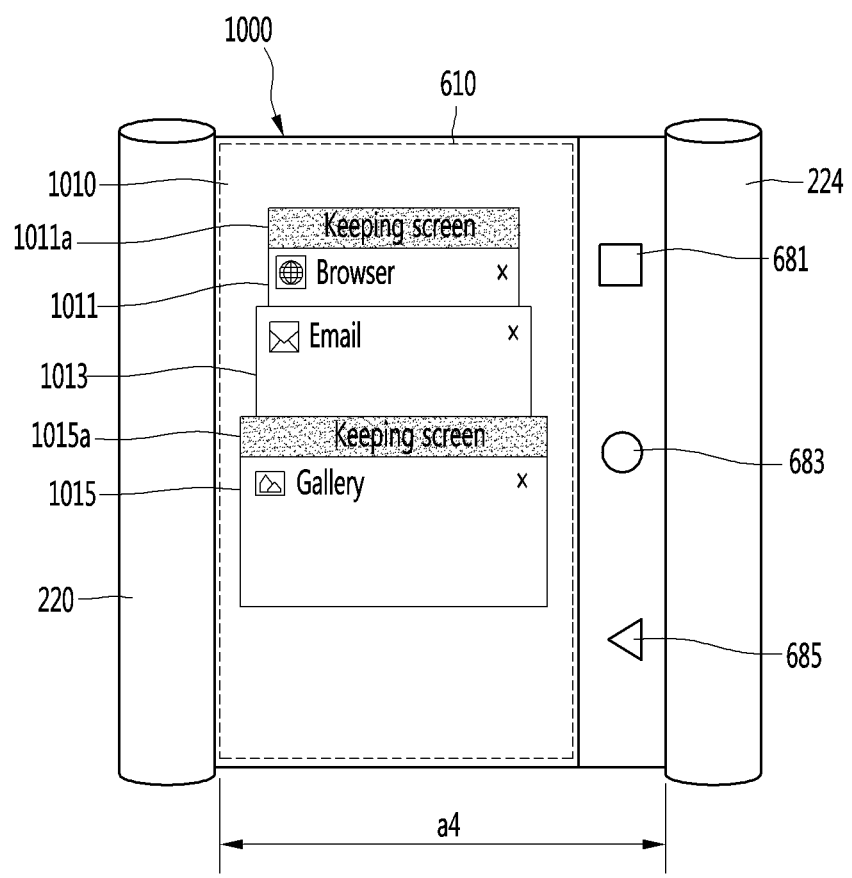
FIGS. 10A to 10F are diagrams illustrating a recent access list according to various embodiments.

Referring to FIG. 10A, the screen 1000 of the display 250 displays a recent access list 1010. If the menu button 681 included in the key input region 680 is selected, the controller 290 can display the recent access list 1010 on the screen 1000. The recent access list 1010 can include a first item 1011, a second item 1013, and a third item 1015. The first item 1011 can be an execution window of an Internet application. The second item 1013 can be an execution window of an email application. The third item 1015 can be an execution window of a gallery application.

The first and third items 1011 and 1015 can be items stored through the process described above with reference to FIGS. 6A to 6D. A single indicator 1011a which indicates storage through selection and screen reduction can be displayed on the first item 1011, and a single indicator 1015a can also be displayed on the third item 1015.

The second item 1013 can be an execution window of an application recently executed. The plurality of items 1011, 1013, and 1015 included in the recent access list 1010 can be arranged in order of time. For example, the third item 1015 can be an item most recently stored, the second item 1013 corresponding to the email application executed can follow the third item 1015, and the first item 1011 can be an item stored after execution of the email application. The controller 290 can arrange the items so that the third item 1015 most recently stored is disposed at the forefront.

Figure 10B:
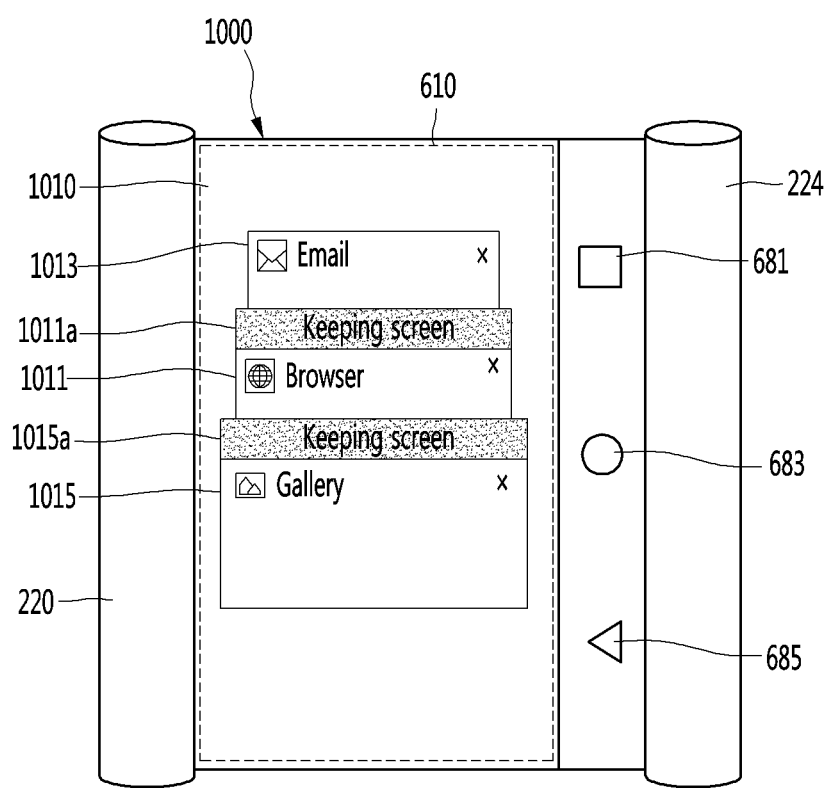

Referring to FIG. 10B, stored items from among the plurality of items 1011, 1013, and 1015 included in the recent access list 1010 can be arranged at the forefront. That is, the third item 1015 most recently stored can be disposed at the forefront, the first item 1011 can follow the third item 1015, and the second item 1013 can follow the first item 1011. The third item 1015 can be largest among the plurality of items, and the first and second items 1011 and 103 can be second-largest and third-largest items respectively.

Figure 10C:
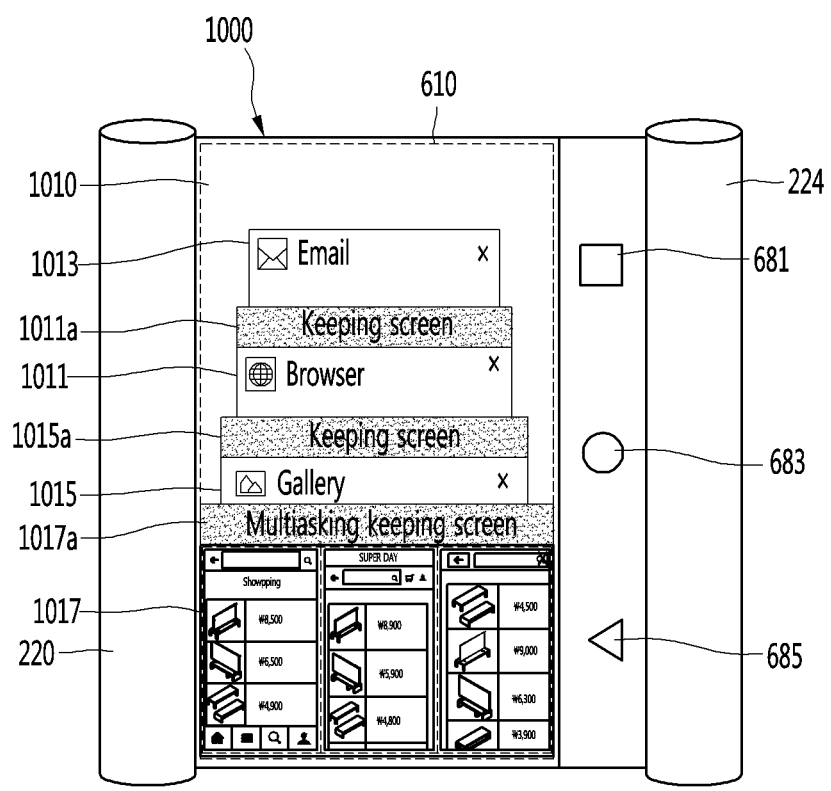

Referring to FIG. 10C, the recent access list 1010 can further include a fourth item 1017 compared to that illustrated in FIG. 10B. That is, the fourth item 1017 can correspond to the item 791 described above with reference to FIGS. 7A and 7B. That is, the fourth item 1017 can represent an item obtained by storing, in a batch, information displayed on a plurality of regions that form an extended screen. A multitasking indicator 1017a can be displayed on the fourth item 1017. The fourth item 1017 can be disposed at the forefront among the plurality of items.

Figure 10D:
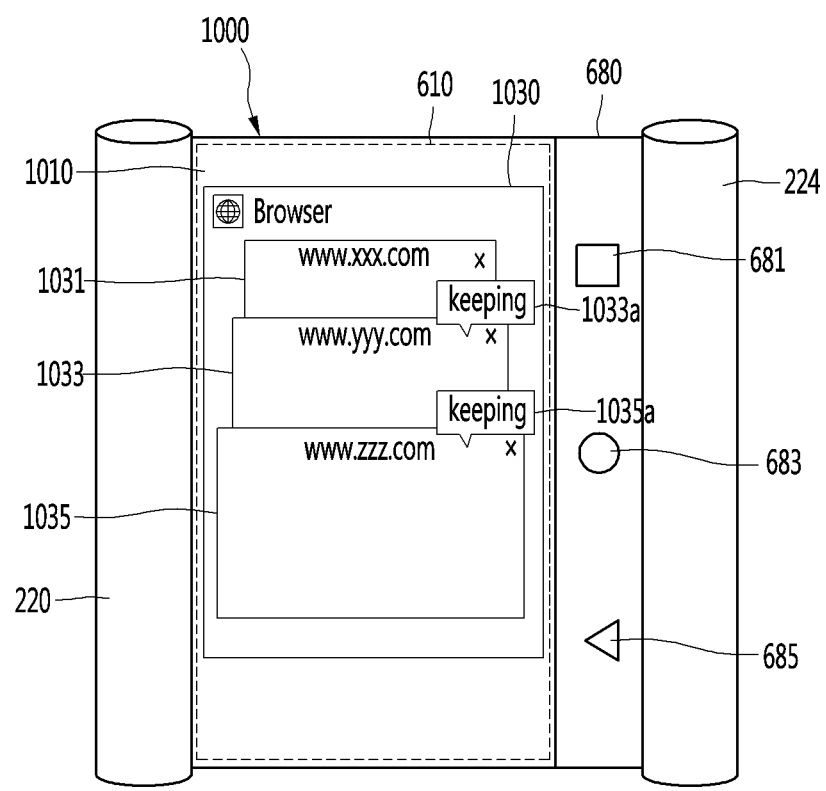

Referring to FIG. 10D, the recent access list 1010 can include a plurality of items. One of the plurality of items can be a group item 1030. The group item can represent an item including execution windows corresponding to one application. That is, the group item can include a plurality of pages. The group item 1030 can include execution windows 1031, 1033, and 1035 of the Internet application. Single indicators 1033a and 1035a can be displayed on some of the execution windows 1031, 1033, and 1035, for example, the execution windows 1033 and 1035.

Figure 10E:
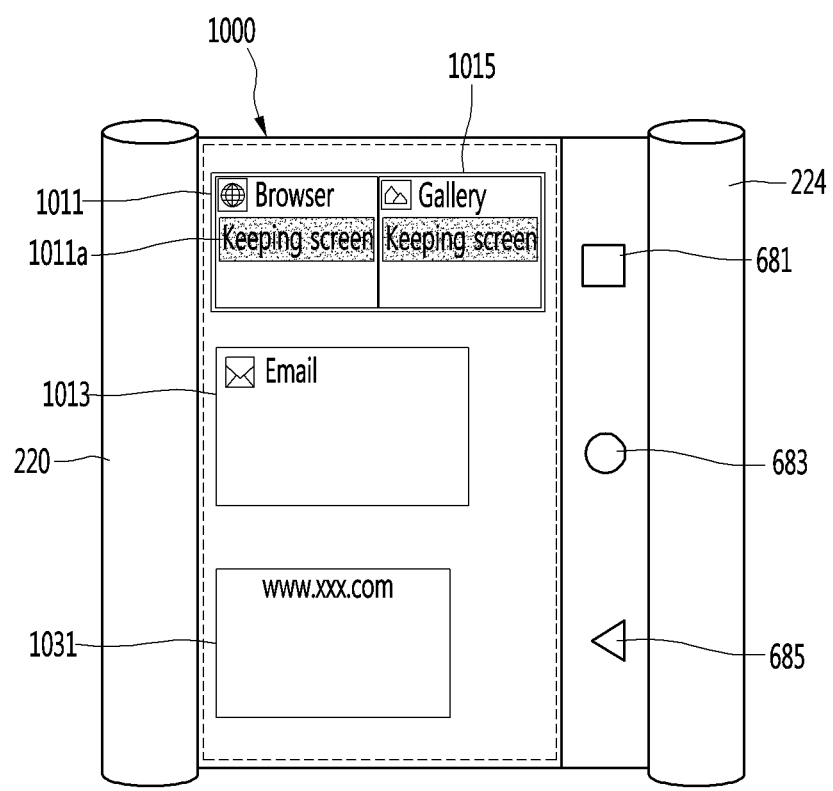

Referring to FIG. 10E, stored items from among the plurality of items included in the recent access list 1010 can be grouped so as to be displayed. For example, since the first and third items 1011 and 1015 are stored items, the first and third items 1011 and 1015 can be grouped together.

Figure 10F:
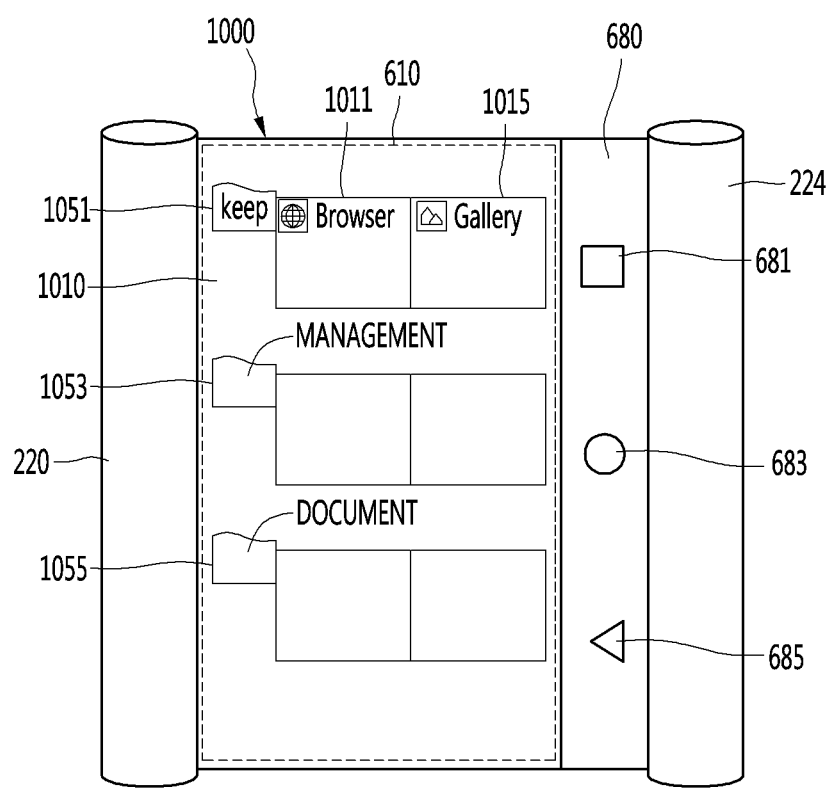

Referring to FIG. 10F, stored items from among the plurality of items included in the recent access list 1010 can be stored in one keep folder 1051. That is, the recent access list 1010 can include a plurality of folders 1051, 1053, and 1055 classified according to the types of items. The keep folder 1051 among the plurality of folders can include the first and third items 1011 and 1015 which are stored items. Some of the items included in the keep folder 1051 can be displayed at one side of the keep folder 1051.

Figure 11A:
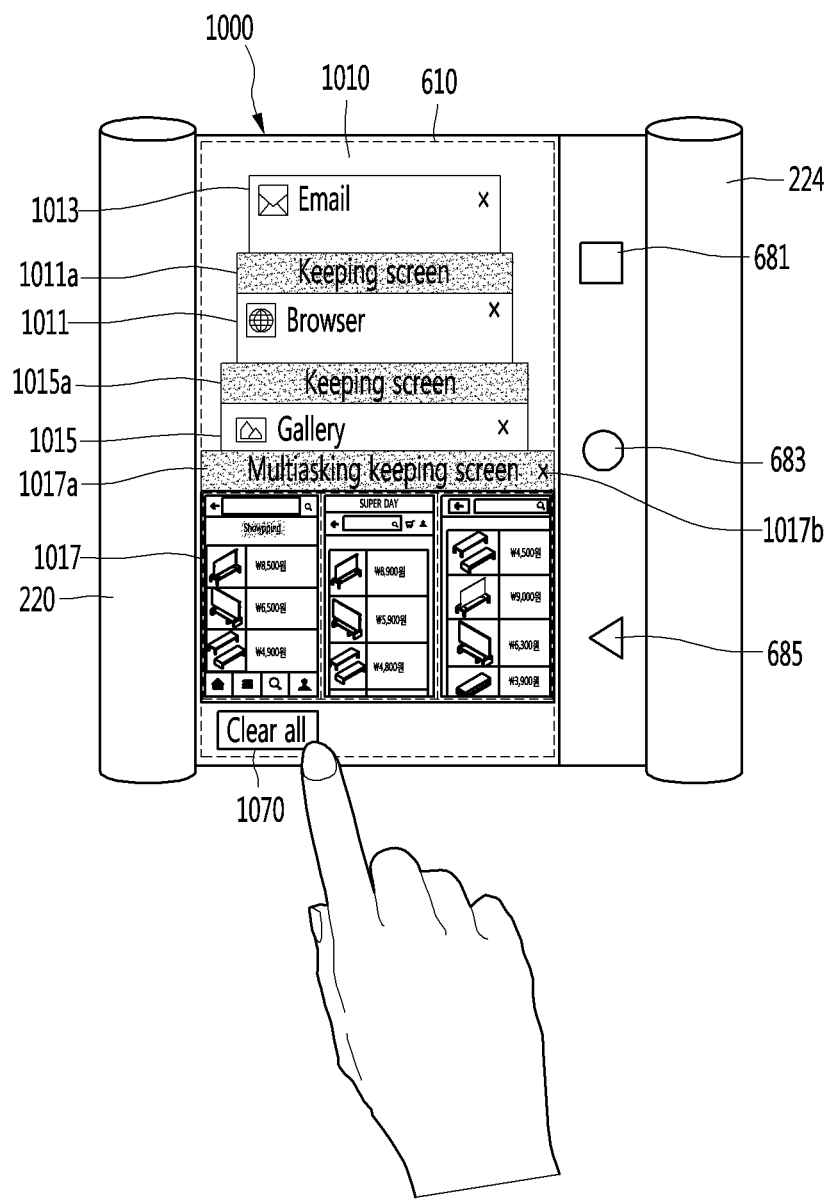
FIGS. 11A and 11B are diagrams illustrating describing an item deleted from a recent access list in response to selection of a delete key.
Figure 11B:
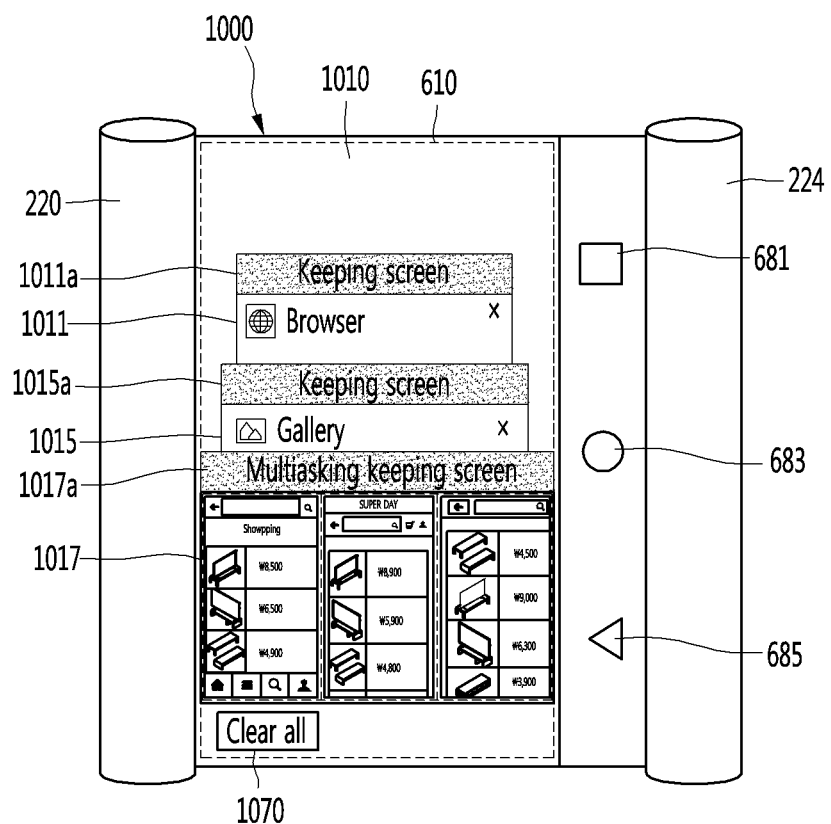

Next, FIGS. 11A and 11B will be described. FIGS. 11A and 11B are diagrams illustrating describing an item deleted from a recent access list in response to selection of a delete key. Regarding FIG. 11A, descriptions which overlap with those of FIG. 10C are not provided below. Referring to FIG. 11A, the recent access list 1010 can include a delete button 1070 for deleting items other than stored items from a plurality of items. That is, if a request for selecting the delete button 1070 is received, the controller 290 can delete the second item 1013 which is not a stored item but indicates an execution window of a recently used application as illustrated in FIG. 11B. That is, even if the delete button 1070 is selected, the stored items 1011, 1015, and 1017 can remain instead of being deleted. The stored items can be deleted in response to selection of an 'x' button (e.g., 1017a) displayed on each item.

The method of FIG. 5 continues to be described below referring back to FIG. 5. The controller 290 receives a request for selecting one of the plurality of items included in the recent access list (S509). The controller 290 displays an item selected in response to the received request (S511). The recent access list can include an item stored through operation S505 and a recently used item. The controller 290 can display, on the screen, an item selected from between the stored item and the used item in response to the request. According to an embodiment, only stored items from among the plurality of items can be called separately.

Figure 12A:
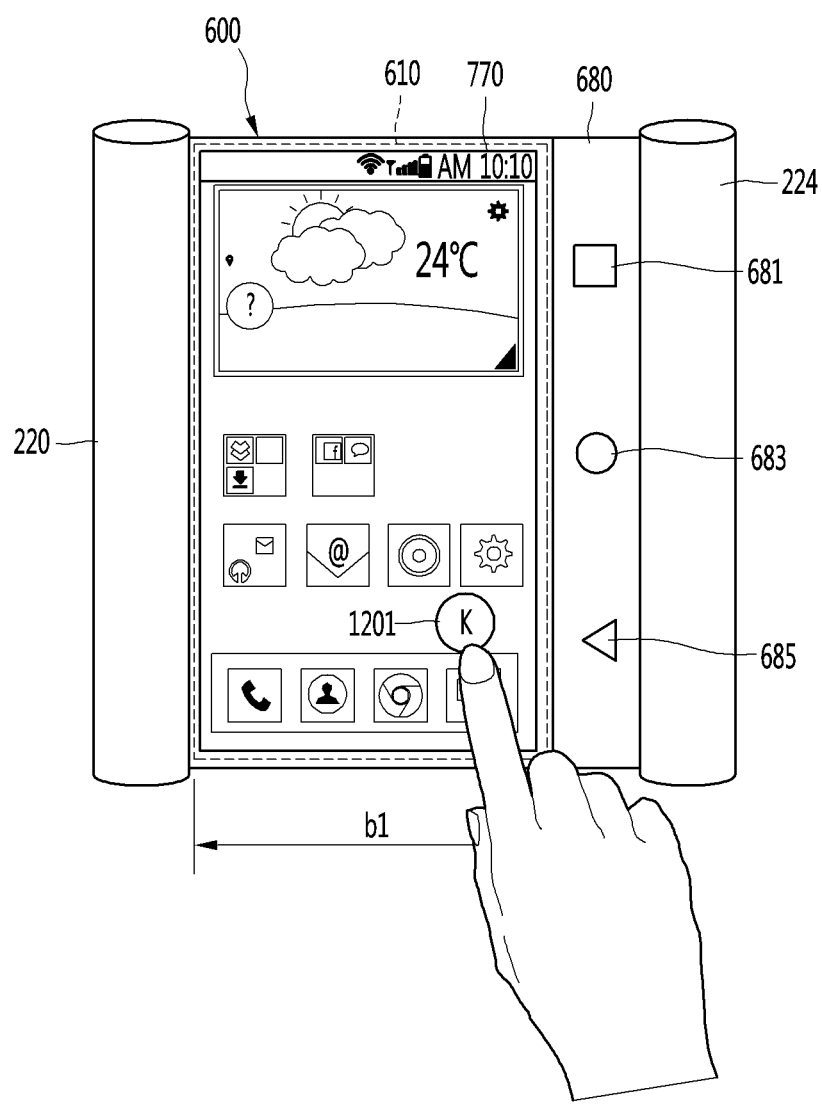
FIGS. 12A to 12C are diagrams illustrating a process of calling a stored item according to an embodiment.
Figure 12B:
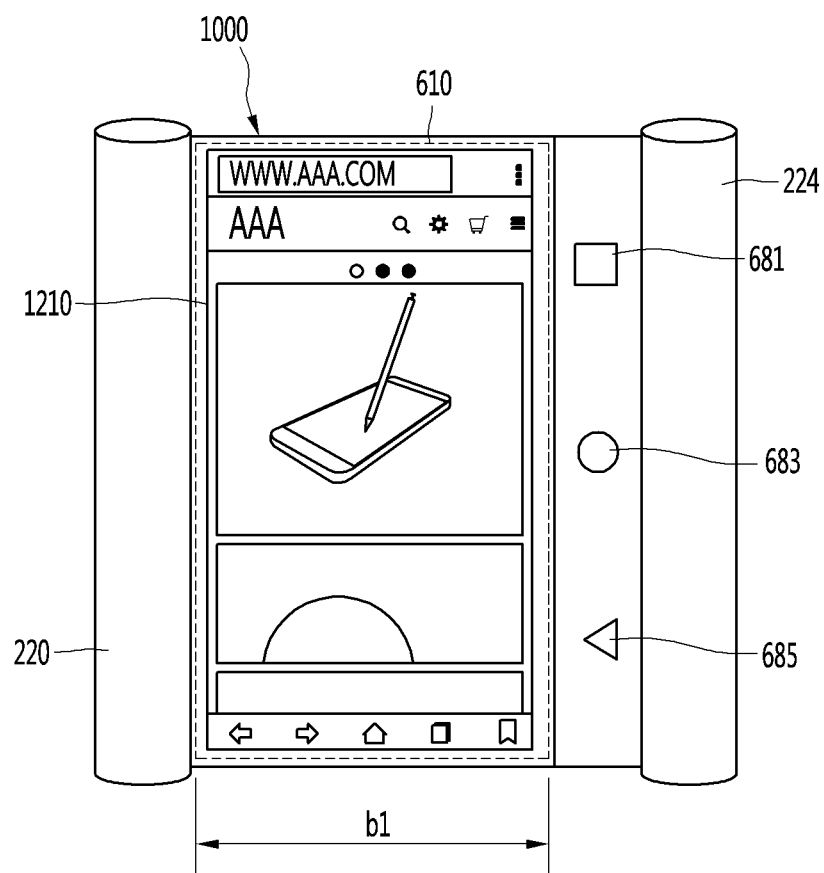
Figure 12C:
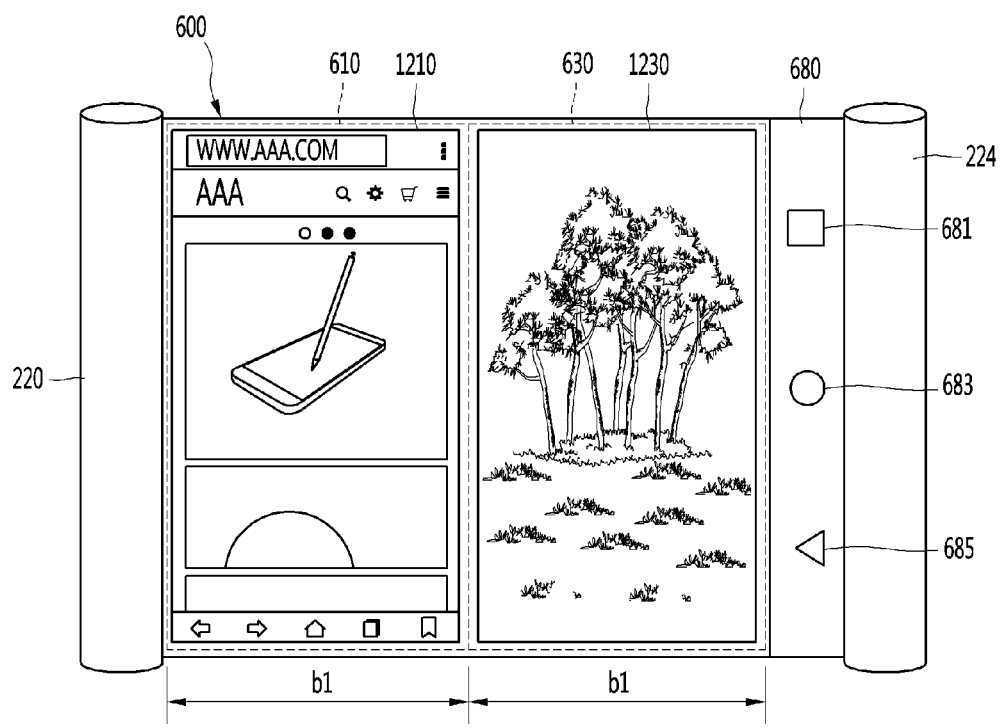

FIGS. 12A to 12C are diagrams illustrating a process of calling a stored item according to an embodiment. Referring to FIG. 12A, the home screen 770 is displayed on the first region 610 of the screen 600. The controller 290 can display a keep icon 1201 for calling a stored item. In one embodiment, when a setting for calling a stored item is established, the keep icon 1201 can be displayed on the home screen 770. In another embodiment, the keep icon 1201 can be constantly displayed on the home screen 770, or can disappear after being displayed for a certain time.

When the keep icon 1201 is selected, the controller 290 can display a most recently stored item 1210 on the screen 600 as illustrated in FIG. 12B. When the keep icon 1201 is selected, the controller 290 can display, on a region extended as the screen 600 is extended, another item stored prior to the item 1210. That is, as illustrated in FIG. 12C, when the screen 600 is extended by as much as the second region 630, the controller 290 can display, on the second region 630, another item 1230 stored prior to the item 1210.

Figure 13A:
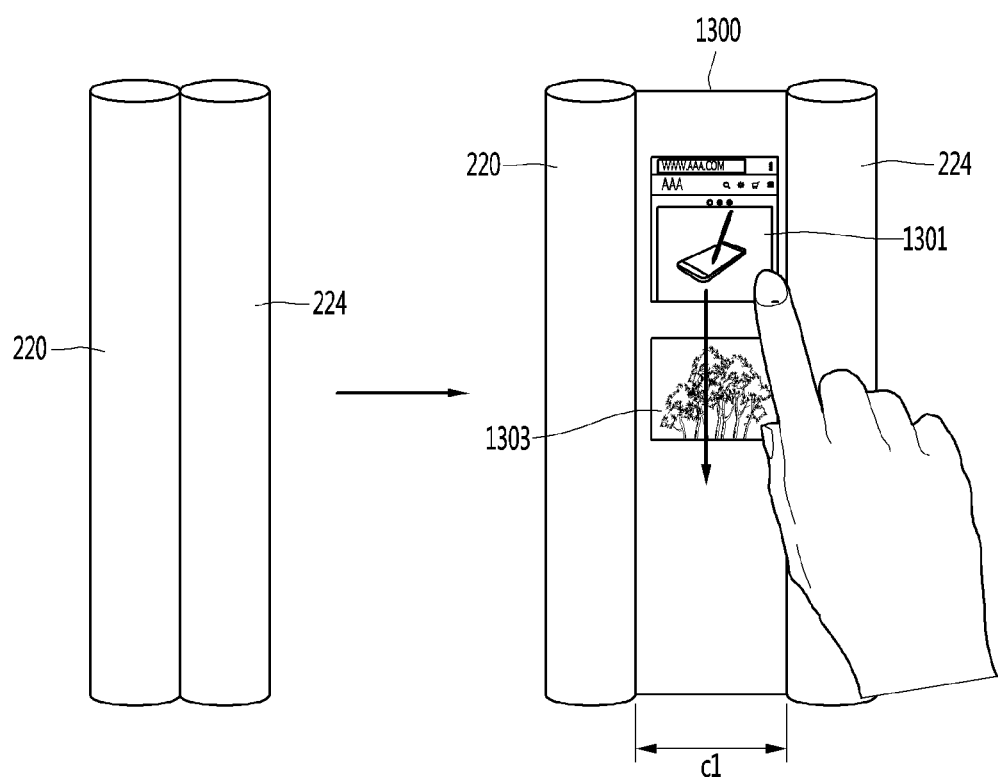
FIGS. 13A and 13B are diagrams illustrating a process of calling a stored item according to another embodiment.
Figure 13B:
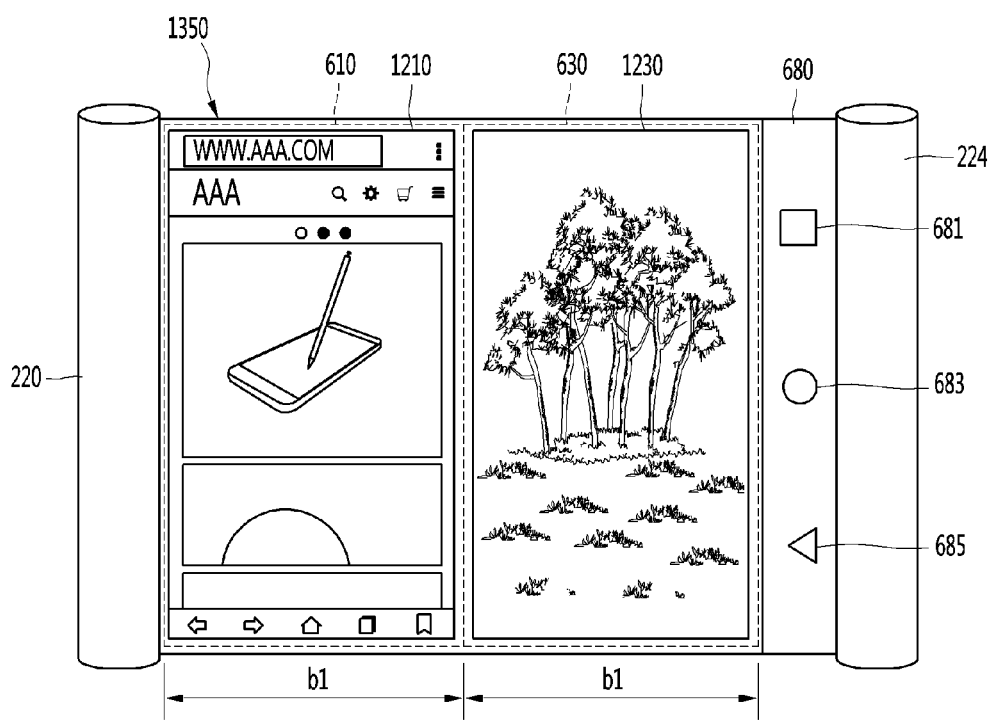

FIGS. 13A and 13B are diagrams illustrating a process of calling a stored item according to another embodiment. Referring to FIG. 13A, the display 250 of the flexible display device 200 can be in a state of not being exposed. That is, the screen of the display 250 can be in a state of not being exposed from the intermediate case 220. Here, if a screen 1300 of the display 250 is exposed by a certain distance c1, the controller 290 can display, on the screen 1300, recently stored items 1301 and 1303. That is, since the user may only slightly spread the screen of the flexible display device 200 with the intention of viewing recently stored items again, the flexible display device 200 can display the recently stored items.

Each of the displayed items 1301 and 1303 can be a thumbnail image. If an input of downwardly dragging the item 1301 is received, the controller 290 can extend the screen as illustrated in FIG. 13B. In one example, the controller 290 can automatically extend the screen as a drag input is received, or can extend the screen based on a user's motion of pulling the second holder 224. An execution window 1210 of the Internet application corresponding to the item 1301 can be displayed on the first region 610 of an extended screen 1350, and an execution window 1230 of the gallery application corresponding to the item 1303 can be displayed on the second region 630.

Figure 14A:
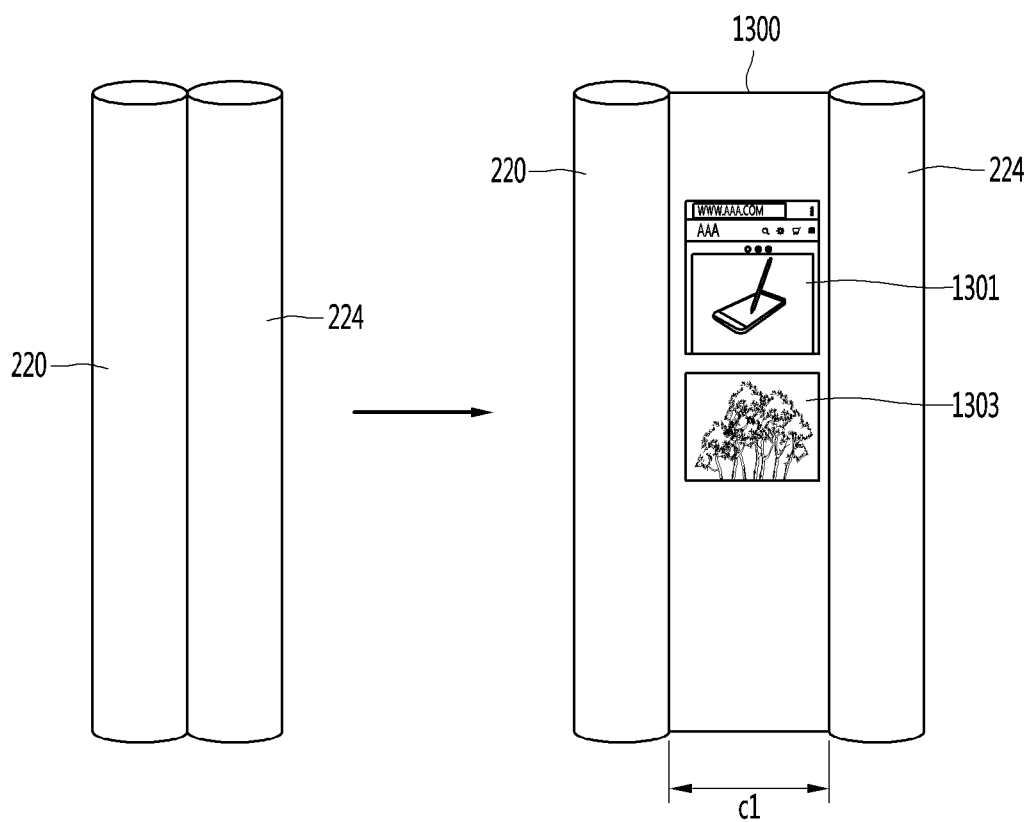
FIGS. 14A to 14E are diagrams illustrating a process of calling a stored item according to another embodiment.
Figure 14B:
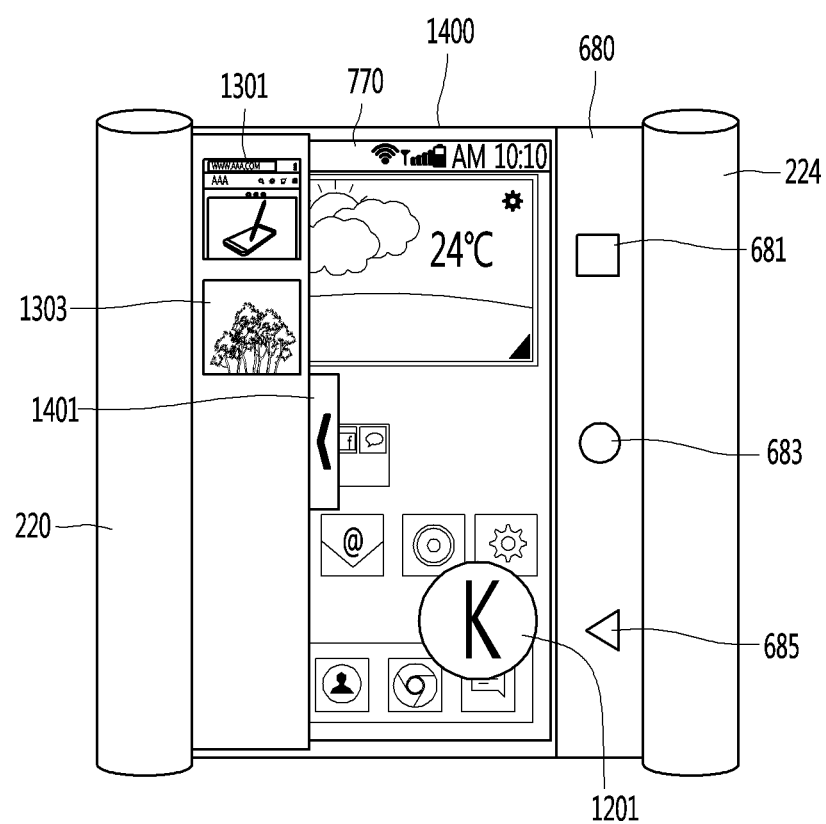

FIGS. 14A to 14E are diagrams illustrating a process of calling a stored item according to another embodiment. FIG. 14A is the same as FIG. 13A. When the controller 290 detects that the screen 1300 is extended after being exposed by the certain distance c1, the controller 290 can display the home screen 770 on an extended screen 1400 as illustrated in FIG. 14B. That is, a drag input to a stored item is not received in this case. The stored items 1301 and 1303 can overlap the home screen 770.

The stored items 1301 and 1303 can disappear after being displayed for a certain time. The stored items 1301 and 1303 can disappear if a hide button 1401 is selected. The controller 290 can further display the keep icon 1201 on the home screen 770. That is, when the controller 290 detects that the screen 1300 is extended after being exposed by the certain distance c1, the controller 290 can display the keep icon 1201 while displaying the home screen 770 on the extended screen 1400 as illustrated in FIG. 14B. An example of calling a stored item in response to selection of the keep icon 1201 has been described with reference to FIGS. 12A to 12C.

Figure 14C:
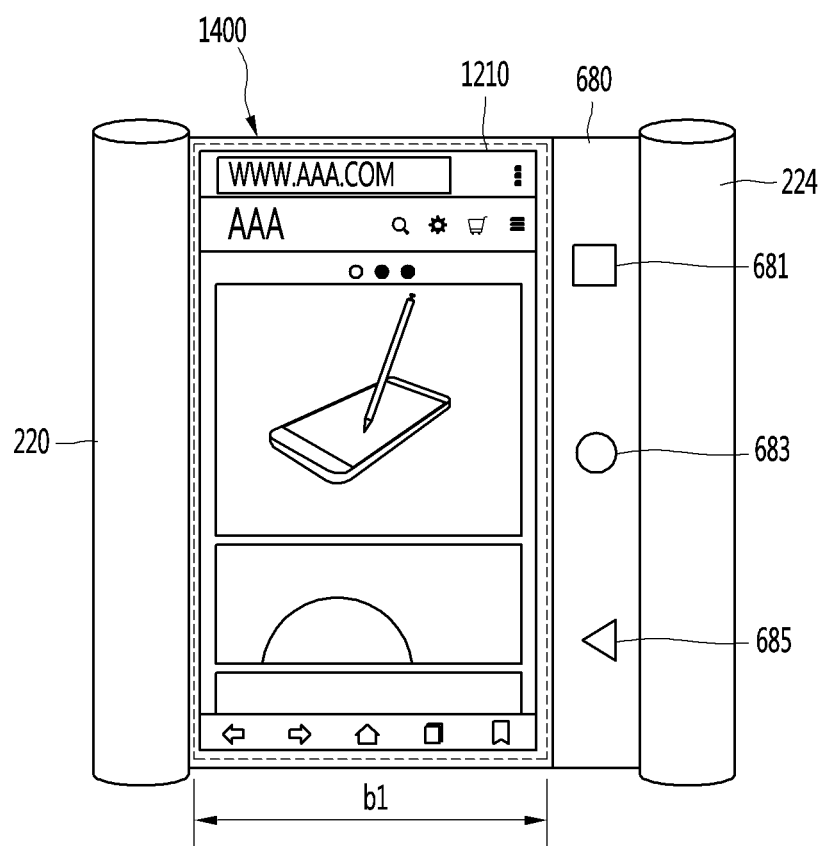
Figure 14D:
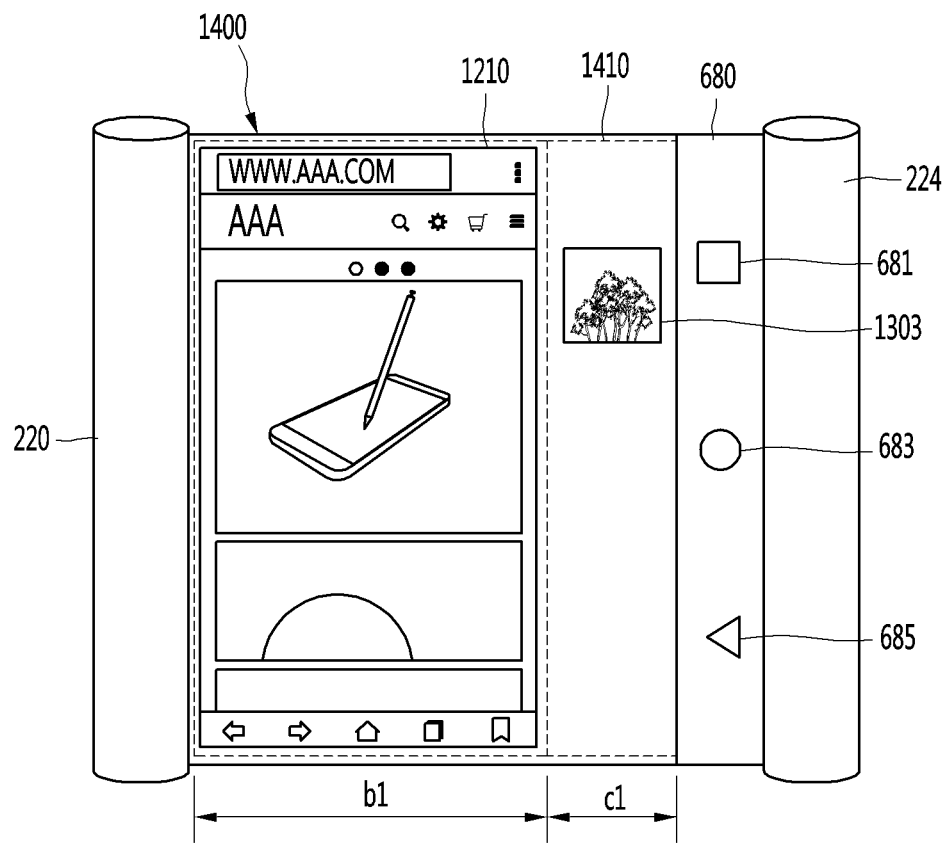
Figure 14E:
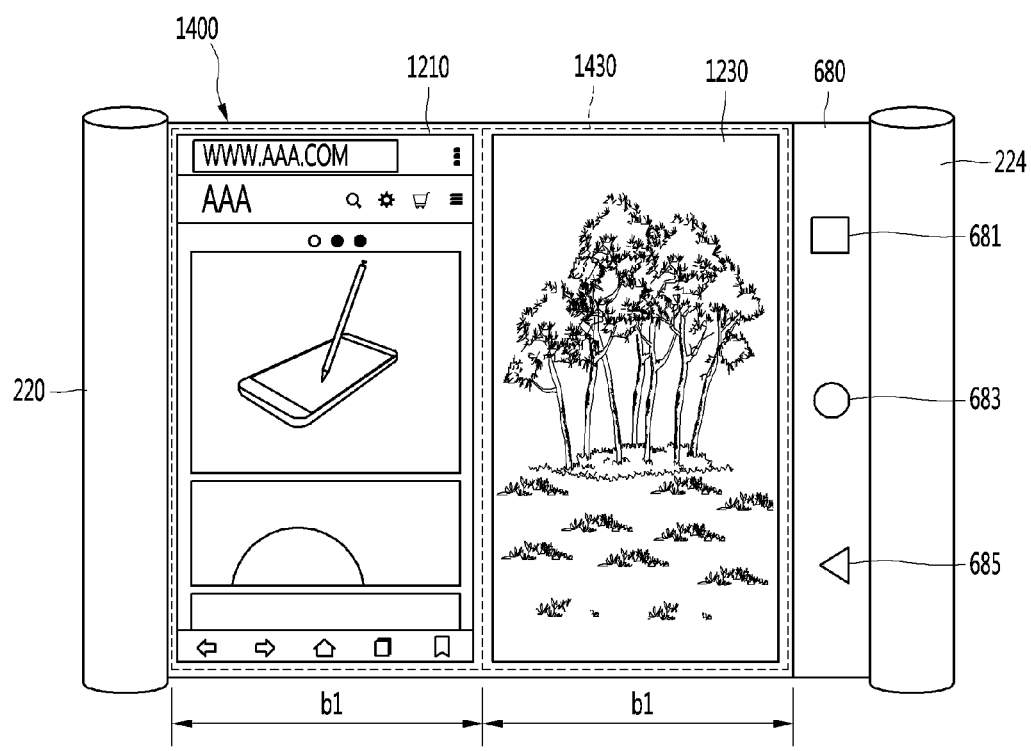

In addition, When the screen 1300 of FIG. 14A is extended while the item 1301 displayed on the screen 1300 is selected, the controller 290 can display, on the extend screen 1400, the execution window 1210 of the Internet application corresponding to the selected item 1301 as illustrated in FIG. 14C. When the screen of FIG. 14C is extended by as much as a region 1410 corresponding to the distance c1, the controller 290 can display, on the region 1410, the item 1303 that is not viewed from a current screen among the stored items as illustrated in FIG. 14D. When the screen is additionally extended by as much as a region 1430 corresponding to the distance b1 after the item 1303 is selected, the controller 290 can display, on the region 1430, the execution window 1230 of the gallery application corresponding to the selected item 1303.

In addition, if the screen of FIG. 14B is extended after the item 1301 is selected, the screen can be switched to the screen of FIG. 14C. If the screen of FIG. 14B is extended without selecting the stored items, a list of applications which are not displayed on the home screen can be displayed on the extended region. According to another embodiment, a stored item can be provided based on an extended size of the screen of the display 250.

Figure 15A:
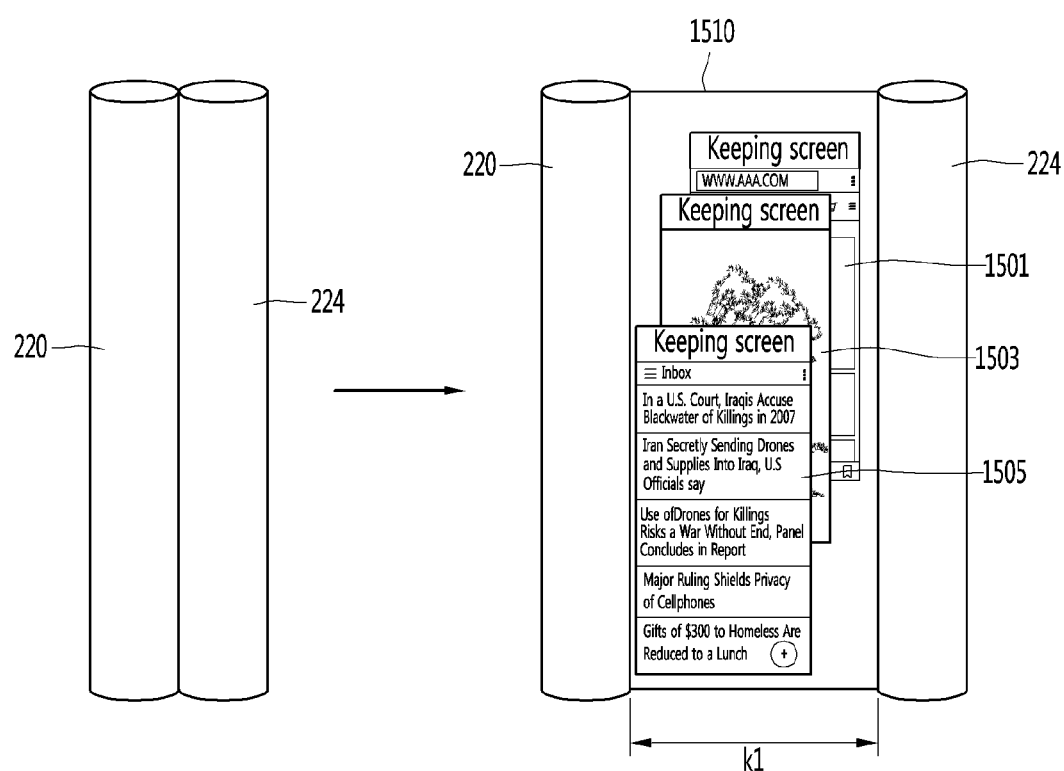
FIGS. 15A to 15C are diagrams illustrating describing an example in which stored items are displayed so that the stored items are fit to an extended screen.
Figure 15B:
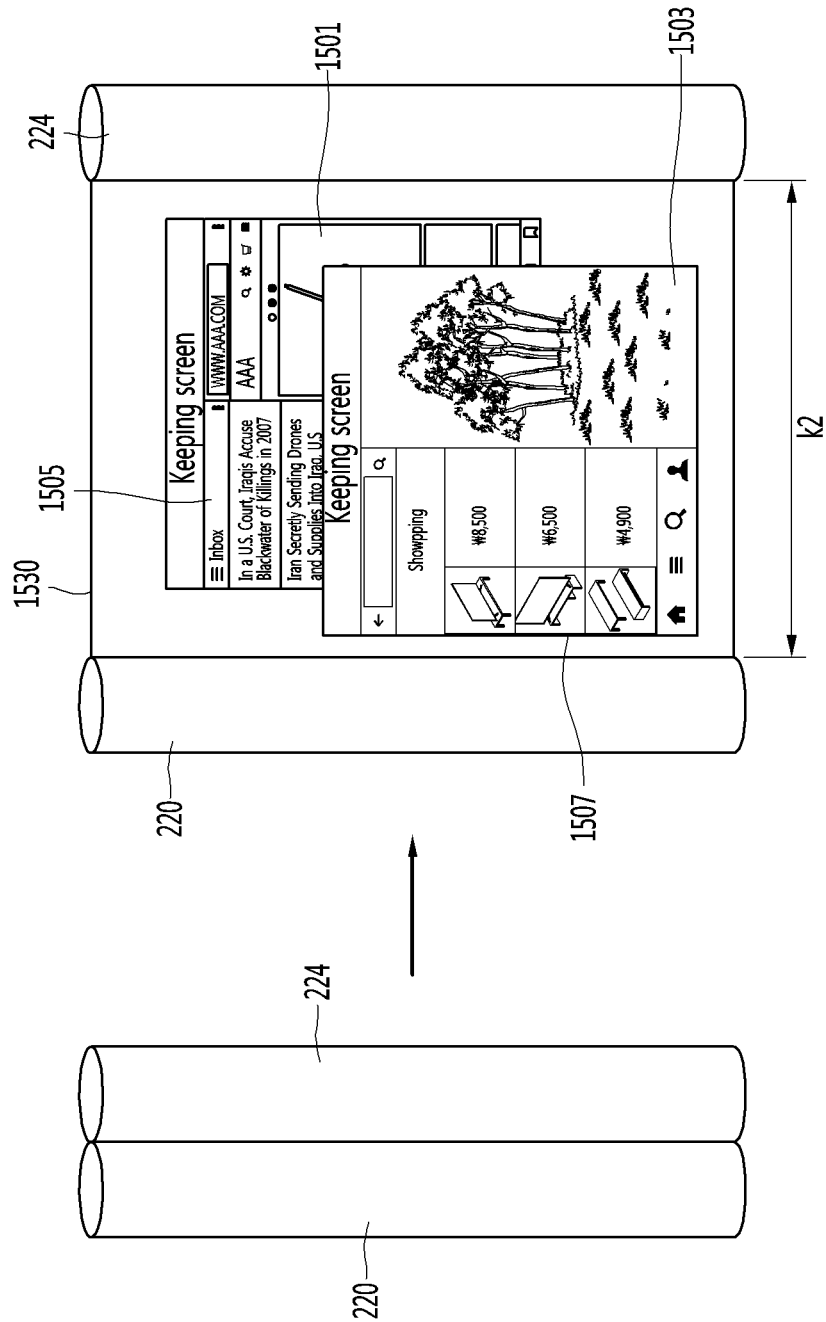
Figure 15C:
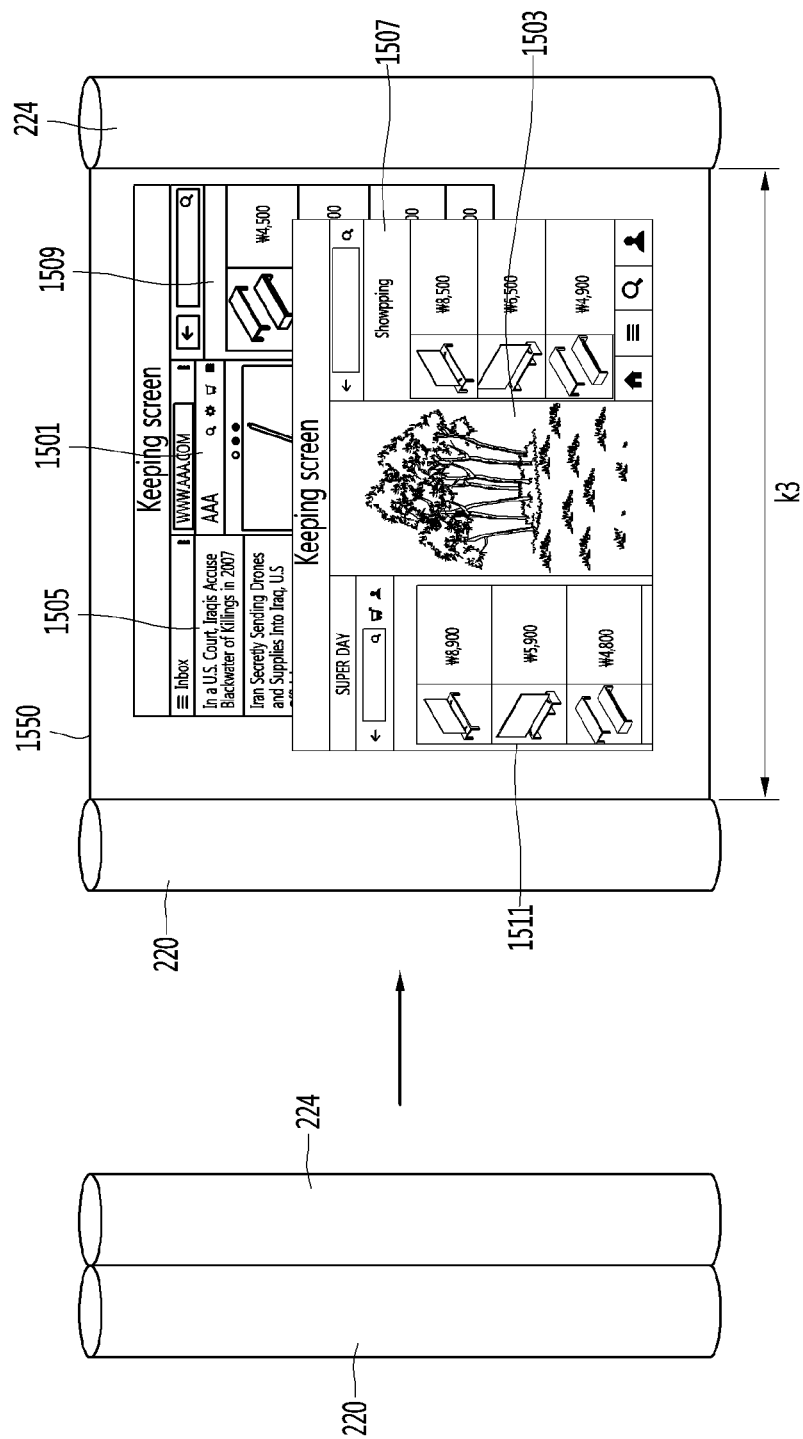

FIGS. 15A to 15C are diagrams illustrating describing an example in which stored items are displayed so that the stored items are fit to an extended screen. Referring to FIG. 15A, the controller 290 can detect that the screen of the display 250 is extended after not being exposed, and can extend the screen by as much as a region corresponding to a distance k1. The controller 290 can display, on an extended screen 1510, the previously stored items 1501, 1503, and 1505. The plurality of stored items 1501, 1503, and 1505 can be displayed so as to be separated from each other.

Referring to FIG. 15B, the controller 290 can detect that the screen of the display 250 is extended after not being exposed, and can extend the screen by as much as a region corresponding to a distance k2. The distance k2 can be two times the distance k1. The controller 290 can display, on an extended screen 1530, the plurality of stored items in bundles of two pages. For example, first and second items 1501 and 1505 can be bundled, and third and fourth items 1505 and 1507 can be bundled. That is, as the size of the screen is increased, more stored items can be displayed.

Referring to FIG. 15C, the controller 290 can detect that the screen of the display 250 is extended after not being exposed, and can extend the screen by as much as a region corresponding to a distance k3. The distance k3 can be three times the distance k1. The controller 290 can display, on an extended screen 1550, the plurality of stored items in bundles of three pages. For example, first, second, and fifth items 1501, 1505, and 1509 can be bundled, and third, fourth, and sixth items 1505, 1507, and 1511 can be bundled. That is, as the size of the screen is increased, more stored items can be displayed.

The method of FIG. 5 continues to be described below referring back to FIG. 5. In addition, when the controller 290 detects that the screen is reduced while displayed information is not selected, the controller 290 reduces the extended screen (S513). Thereafter, the process proceeds to operation S507.

According to various embodiments of the present disclosure, various information can be provided according to a degree of extension of a screen of a display so that the needs of a user can be met. Furthermore, the user can efficiently store information displayed on a display and can efficiently call the information.

The above-mentioned embodiments can be implemented as computer-readable codes in a program-recorded medium. A computer-readable medium includes any type of a recording device for storing data readably by a computer system. The computer-readable medium includes, for example, a hard disk drive, a solid state disk (SSD), a silicon disk drive (SDD), a ROM, a RAM, a CD-ROM, a magnetic tape, a floppy disk, and an optical data storage device, and can also be implemented in the form of a carrier wave (for example, transmission via the Internet). Furthermore, the above-mentioned computer can include the controller 180 of the terminal. Therefore, the above description should not be construed as restrictive but should be considered to be merely illustrative. The scope of the present disclosure should be determined through rational interpretation of the accompanying claims, and all modifications within the equivalent scope of the present disclosure fall within the scope of the present disclosure.

What is claimed is:
1. A flexible display device comprising:
a memory;
a display including an extendable and reducible screen;
a sensor configured to detect a size of the screen; and
a controller configured to:

display information on the extended screen, and
store the information in the memory in response to the size of the screen being reduced while the information is selected,
wherein the screen comprises a first region for displaying first information and a second region for displaying second information, and
wherein the controller is further configured to store the first information and the second information as one item in response to a touch input being dragged from the second information to the first information while the screen is reduced.

2. The flexible display device according to claim 1, wherein the screen comprises a first region for displaying first information and a second region for displaying second information, and
wherein the controller is further configured to store the second information in the memory in response to the second region being reduced while the second information displayed on the second region is selected.

3. The flexible display device according to claim 1, wherein the controller is further configured to store the first information and the second information as a captured image in the memory.

4. The flexible display device according to claim 1, wherein the controller is further configured to individually control the first region and the second region.

5. The flexible display device according to claim 1, wherein the controller is further configured to:
in response to a request, distinguishably display a recent access list including accessed information stored in response to the screen being reduced from other accessed information.

6. The flexible display device according to claim 5, wherein the controller is further configured to display an indicator on the access information indicating the accessed information was stored in response to the screen being reduced.

7. The flexible display device according to claim 5, wherein the controller is further configured to display multiple stored accessed information as being grouped together.

8. The flexible display device according to claim 1, wherein the controller is further configured to:
display a home screen on the display,
display an icon for displaying the stored information, and
display the stored information in response to selection of the icon.

9. The flexible display device according to claim 1, wherein the controller is further configured to display a thumbnail image corresponding to the stored information in response to the screen being extended from a non-extended state.

10. The flexible display device according to claim 9, wherein the controller is further configured to display the stored information in response to the thumbnail image being selected.

11. The flexible display device according to claim 9, wherein the controller is further configured to redisplay the home screen in response to the screen being additionally extended while the thumbnail image is not selected.

12. The flexible display device according to claim 1, wherein the information comprises an execution window of an application or multimedia content.

13. The flexible display device according to claim 1, wherein the controller is further configured to display a popup window indicating that the information has been stored.

14. A method of controlling a flexible display device including an extendable and reducible screen, the method comprising:
detecting, via a sensor of the flexible display device, a size of the screen;
displaying, via a controller of the flexible display device, information on the extended screen; and
storing, in a memory, the information in response to the size of the screen being reduced while the information is selected,
wherein the screen comprises a first region for displaying first information and a second region for displaying second information, and
wherein the method further comprises storing the first information and the second information as one item in response to a touch input being dragged from the second information to the first information while the screen is reduced.

15. The method according to claim 14, wherein the screen comprises a first region for displaying first information and a second region for displaying second information, and
wherein the method further comprises storing the second information in the memory in response to the second region being reduced while the second information displayed on the second region is selected.

16. The method according to claim 14, further comprising:
storing the first information and the second information as a captured image in the memory.

17. The method according to claim 14, further comprising:
individually controlling, via the controller, the first region and the second region.

18. The method according to claim 14, further comprising:
in response to a request, distinguishably displaying a recent access list on the flexible display device including stored accessed information stored in response to the screen being reduced from other accessed information.

* * * * *